(12) United States Patent
Popp et al.

(10) Patent No.: US 7,698,286 B2
(45) Date of Patent: *Apr. 13, 2010

(54) METHOD AND APPARATUS FOR MANAGING INTERNET TRANSACTIONS

(75) Inventors: Nicolas Popp, Menlo Park, CA (US);
Bruce Ong, San Francisco, CA (US);
Charles D'Harcourt, San Francisco, CA (US)

(73) Assignee: Next Software, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/647,795

(22) Filed: Dec. 29, 2006

(65) Prior Publication Data
US 2007/0113193 A1 May 17, 2007

Related U.S. Application Data

(63) Continuation of application No. 11/496,965, filed on Jul. 31, 2006, now Pat. No. 7,652,680.

(51) Int. Cl.
G06F 17/00 (2006.01)
G06F 7/00 (2006.01)

(52) U.S. Cl. .................. 707/100; 707/101; 707/102; 707/103 R; 707/103 X; 707/103 Y; 707/103 Z; 715/234

(58) Field of Classification Search .................. 707/1, 707/100, 101, 102, 103 R, 103 X, 103 Y, 707/103 Z; 715/234
See application file for complete search history.

(56) References Cited

U.S. PATENT DOCUMENTS

| 4,960,031 A | 10/1990 | Farrand |
| 5,297,249 A | 3/1994 | Bernstein et al. |
| 5,327,529 A | 7/1994 | Fults et al. |
| 5,408,655 A | 4/1995 | Oren et al. |
| 5,524,201 A | 6/1996 | Shwarts et al. |
| 5,546,577 A | 8/1996 | Marlin et al. |
| 5,557,722 A | 9/1996 | DeRose et al. |

(Continued)

OTHER PUBLICATIONS

Silva et al. DAC '95: Proceedings of the 32nd ACM/IEEE Conference on Design Automation. "The Case for Design Using the World Wide Web." Jan. 1995.*

(Continued)

*Primary Examiner*—Kee M Tung
*Assistant Examiner*—Jacinta Crawford
(74) *Attorney, Agent, or Firm*—Van Pelt, Yi & James LLP

(57) ABSTRACT

The object-oriented approach used by the present invention provides the ability to develop and manage Internet transactions. Local applications can be accessed using any workstation connected to the Internet regardless of the workstation's configuration. Some or all of a Web page can be generated dynamically using input received in a returned page, generated at runtime, or retrieved from an external data source (e.g., database or electronic mail system). When the Web page definition is rendered, the information contained in template(s), declaration file(s), and object(s) are used to generate standard definitions. State information is maintained across transactions. Using state information, virtual applications, sessions, transactions, and pages can be implemented. Self-contained modules, or components, provide the ability to share implementations and create multi-content documents. Event objects can be used to assist in event handling management.

30 Claims, 22 Drawing Sheets

U.S. PATENT DOCUMENTS

| | | | |
|---|---|---|---|
| 5,608,446 | A | 3/1997 | Carr et al. |
| 5,652,880 | A | 7/1997 | Seagraves |
| 5,701,451 | A | 12/1997 | Rogers et al. |
| 5,710,887 | A | 1/1998 | Chelliah et al. |
| 5,715,444 | A | 2/1998 | Danish et al. |
| 5,732,219 | A | 3/1998 | Blumer et al. |
| 5,742,762 | A * | 4/1998 | Scholl et al. ............... 709/200 |
| 5,742,845 | A | 4/1998 | Wagner |
| 5,745,360 | A | 4/1998 | Leone et al. |
| 5,745,754 | A * | 4/1998 | Lagarde et al. ........... 707/104.1 |
| 5,752,246 | A * | 5/1998 | Rogers et al. ................. 707/10 |
| 5,793,964 | A | 8/1998 | Rogers et al. |
| 5,809,248 | A | 9/1998 | Vidovic |
| 5,878,421 | A | 3/1999 | Ferrel et al. |
| 5,913,040 | A | 6/1999 | Rakavy et al. |
| 5,974,409 | A | 10/1999 | Sanu et al. |
| 6,249,291 | B1 * | 6/2001 | Popp et al. ................... 345/473 |
| 6,651,108 | B2 | 11/2003 | Popp et al. |

OTHER PUBLICATIONS

Honda et al. "Virtual Society: Extending the WWW to Support a Multi-user Interactive Shared 3D Environment", Jan. 1995, ACM, pp. 109-116.

Elvins et al., "Web-based Volumetric Data Retrieval", 1995, ACM, pp. 7-12.

Iyer et al., "Distributed Exploratorium for High Performance Computational Techniques," 1994, IEEE, pp. 117-125.

Eric Kasten, "HTML A Gentle Introduction", Jul. 1995, Linux Journal, Specialized Systems Consultants.

Pichler et al., "VRweb: A Multi-System Viewer", Jan. 1995, ACM, pp. 77-85, 139.

Silva et al., "The Case for Design Using the World Wide Web", Jan. 1995, ACM.

Eric Kasten, "Access Information Through World Wide Web—Installing CERN's WWW Server", May 1995, Linux Journal.

Eric Kasten, "HTML Forms: Interacting with the Net", Aug. 1995, Linux Journal.

Broll et al., "Bringing Worlds Together: Adding Multi-User Support to VRML" Jan. 1995, ACM, pp. 87-94.

Black et al., "Objects to the rescue! Or httpd: the next generation operating system", 1994, ACM, pp. 100-104.

Tolone et al., "Specifying Dynamic Support for Collaborative Work within WORLDS", 1995, ACM, pp. 55-65.

* cited by examiner

METHOD AND APPARATUS FOR MANAGING INTERNET TRANSACTIONS

This is a Continuation of prior application Ser. No. 11/496,965, filed Jul. 31, 2006, now U.S. Pat. No. 7,652,680, which claims priority to prior application Ser. No. 11/327,196, filed Jan. 6, 2006, which claims priority to application Ser. No. 09/842,284, filed Apr. 24, 2001, now U.S. Pat. No. 7,046,261, which claims priority to application Ser. No. 08/532,491, filed Sep. 22, 1995, now U.S. Pat. No. 6,249,291, which is hereby incorporated by reference.

BACKGROUND OF THE INVENTION

1. Field of the Invention

This invention relates to the development and management of transactions on the Internet.

2. Background

The Internet is a worldwide matrix of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, download a file from or send an electronic mail message to another computer/client using the Internet.

To retrieve a file on the Internet, a client must search for the file, make a connection to the computer on which the file is stored, and download the file. Each of these steps may involve a separate application and access to multiple, dissimilar computer systems. The World Wide Web (WWW) was developed to provide a simpler, more uniform means for accessing information on the Internet.

The components of the WWW include browser software, network links, and servers. The browser software, or browser, is a graphical interface (i.e., front-end) that simplifies access to the Internet. A browser allows a client to communicate a request without having to learn a complicated command syntax. A browser typically provides a graphical user interface (GUI) for displaying information and receiving input. Examples of browsers currently available include Mosaic, Netscape, and Cello.

Information servers maintain the information on the WWW and are capable of processing a client request. Hypertext Transport Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested (e.g., GET an object from the server or POST data to an object on the server). The HTTP server responds to the client by sending a status of the request and the requested information. The connection is then terminated between the client and the HTTP server. A connection between a client and an HTTP server therefore has four stages: 1) initiation, 2) request transmittal, 3) response transmittal, and 4) termination. A connection can only process a single transaction or interaction between the client and the HTTP server.

The HTTP server does not retain any information about the request after the connection has been terminated. HTTP is therefore, a stateless protocol. That is, a client can make several requests of an HTTP server, but each individual request is treated independent of any other request. The server has no recollection of any previous request.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines the mechanisms by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents. A language is used to define the format for a page to be displayed in the WWW. The language is called Hypertext Markup Language (HTML). A WWW page is transmitted to a client as an HTML document. The browser executing at the client parses the document and produces a displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, radio buttons, for example. Each block has properties such as name, type, and value. The following provides an example of the structure of an HTML document:

```
<HTML>
    <HEAD>
        ... element(s) valid in the document head
    </HEAD>
    <BODY>
        ... element(s) valid in the document body
    </BODY>
</HTML>
```

Each HTML element is delimited by the pair of characters "<" and ">". The name of the HTML element is contained within the delimiting characters. The combination of the name and delimiting characters is referred to as a tag. Each element is identified by its tag. In most cases, each element has a start and ending tag. The ending tag is identified by the inclusion of an another character, "/" that follows the first delimiting character ("<").

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other elements are described by any HTML reference manual.

Web-based access has been used for simple information publishing that consisted of static data and no logic. For example, a client request might request another page. The HTTP server fetches a pre-defined Web page using the URL contained in the request. The Web page is returned to the client. Web-based access has progressed to dynamic information publishing that allows some simple queries and some limited logic to access a database and display database information. Web applications have been used in commerce to order articles of manufacture via the Web (e.g., a personal stereo cassette deck). Commerce applications provide some limited logic and allow a Web page to change based on the client input.

Web-based applications are developed independent of other Web-based applications. That is, constructs used to implement one Web-based application remain local to the application. They are not shared.

Currently, a common gateway interface program is written to process a single transaction. Minimal state information is retained within the HTML document. It would be beneficial to use object-oriented HTML elements to manage a series of Internet transactions and to maintain state information across Internet transactions. It would be beneficial to be able to generate HTML documents dynamically using information from a previous transaction, corporate data, and data retained in HTML element objects. It would be beneficial to be able to share application development across applications.

SUMMARY OF THE INVENTION

The object-oriented approach used by the present invention provides the ability to develop and manage Internet transactions. An HTML document can be generated dynamically. Some or all of a form can be generated based on input received in a receive form, generated at runtime, or retrieved from an external data source (e.g., database or electronic mail system). When the HTML document is rendered, the information contained in HTML template(s), declaration file(s), and object(s) are used to generate standard HTML.

Information regarding a client request is maintained by the application that processes the client request. The information is maintained in a state, or context. Different levels of state information are maintained by the present invention. The state level defines the duration and scope of the state information. Storage policies define the method of storage used for state information. By maintaining a context having levels, it is possible to form a virtual session with each user accessing an application such that an application can serve any request in any order.

Using the present invention, a user can connect to a local Internet provider and use the Web to connect to a home page. Once the connection is established, the present invention is used with an application on the server side of the connection to dynamically generate Web pages. The Web pages contain application information and provide the ability for the user to specify input. A browser executing on the user's workstation receives a Web page from the Internet and sends a response containing user input via the Internet. The present invention can be used to generate Web pages in response to the user input. Thus, a user can access an application located anywhere relative to the application server by using any local workstation hardware and software platform.

When a client request is received by the application, the application manages the update and retrieval of data from the context, processes the received form (i.e., the form received from the client that includes the client request), and processes any return form (i.e., a form sent to the client in response to the client request).

All or some portion of the Web page is dynamically generated. Classes of object are associated with elements that defined a Web page (e.g., HTML elements). By objectifying Web pages it is possible to gain the advantages of object-oriented programming with Web pages. These advantages include rapid application development through object reuse, transparent distribution, simplified maintenance, and scalability. These advantages can be achieved using the common interface provided by Web browsers.

Object instances associated with definitional elements are instantiated during execution to manage their respective portions of the Web page. Control objects are associated with definitional elements to facilitate the flow of information to and from external data sources.

Definitional elements can be grouped together. A group object class provides the ability to access these definitional elements as a group. A special type of control referred to as a repetition control allows a group to be activated multiple times. Each activation of a group of definitional elements generates one occurrence of a repeating portion of the Web page.

Self-contained modules, or components, can be accessed to provide additional definition for the Web page. A control object is associated with one of these modules to manage its integration into the rest of the Web page definition. The self-contained modules can be shared by one or more Web pages in a single application and/or across multiple applications executing on application server 316 (or any other server).

A page definition has some combination of the following associated resources: template(s), association(s), and custom logic. A template contains an initial definition for some or all of the page. At runtime, some or all of the initial definition can be dynamically altered. Associations provide declaration and binding information. Custom logic provides custom functionality.

A reusable or sharable construct of the present invention is referred to as a component. A component can represent an entire page or some portion of a page. A component has none or more resources. A resource can be, for example, a template, association, or custom logic. A component owns its associated resources.

One or more components can be combined to define a page. A component can be defined using different definitional constructs (e.g., HTML, VRML, PDF, etc.). By combining these components as a single Web page, a document can be derived from multiple definitional constructs.

A control class provides object cover for components. An abstract class provides the ability to: associate a Web object (e.g., an HTML element object) with a corporate object, generate static elements, and modify an object tree. Subclasses of the control class inherit behavior from the abstract class. Instances of these subclasses provide push and pull mode associative behavior. In push mode, data retrieved from an external data source (or another source) is used to dynamically generate a Web page. In pull mode, data contained in the Web page can be stored into the context or corporate object.

A control object can have subcontrols that are themselves control objects. Subcontrols can be pre-defined or generated at runtime. The associative behavior of a subcontrol is attributed to the parent control object. A control object activates a subcontrol's push and pull modes by forwarding the activation message that it received.

Event objects are used to handle a client request. These event objects contain request information and behavior to verify and process an client request. Custom logic can be invoked during event handling. The application manages the process and event objects.

DETAILED DESCRIPTION OF THE INVENTION

A method and apparatus for developing and managing Internet transactions is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
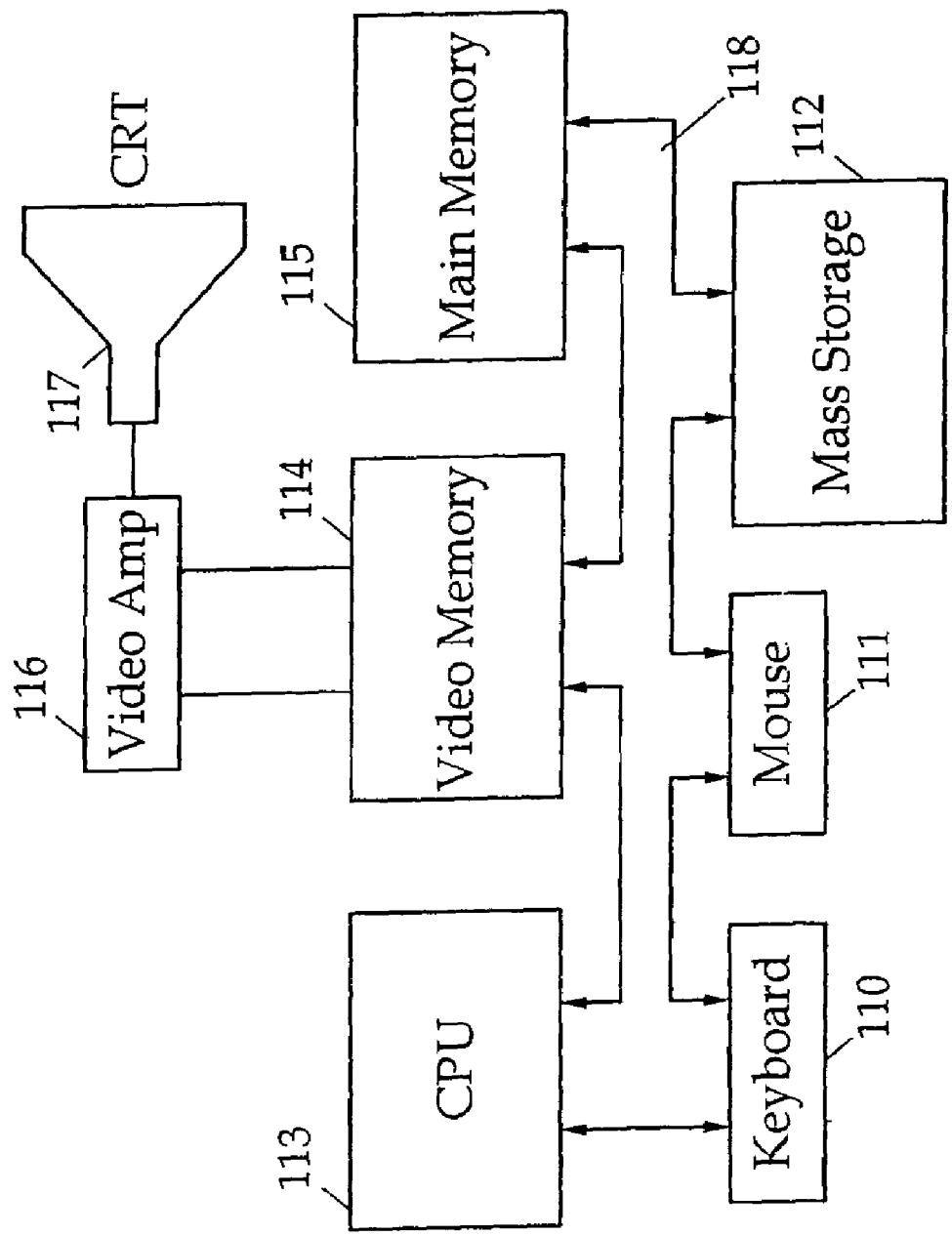
FIG. 1 provides an example of a general purpose computer to be used with the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680.times.0 processor or a microprocessor manufactured by Intel, such as the 80.times.86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is a means for developing and managing Internet transactions.

Figure 2:
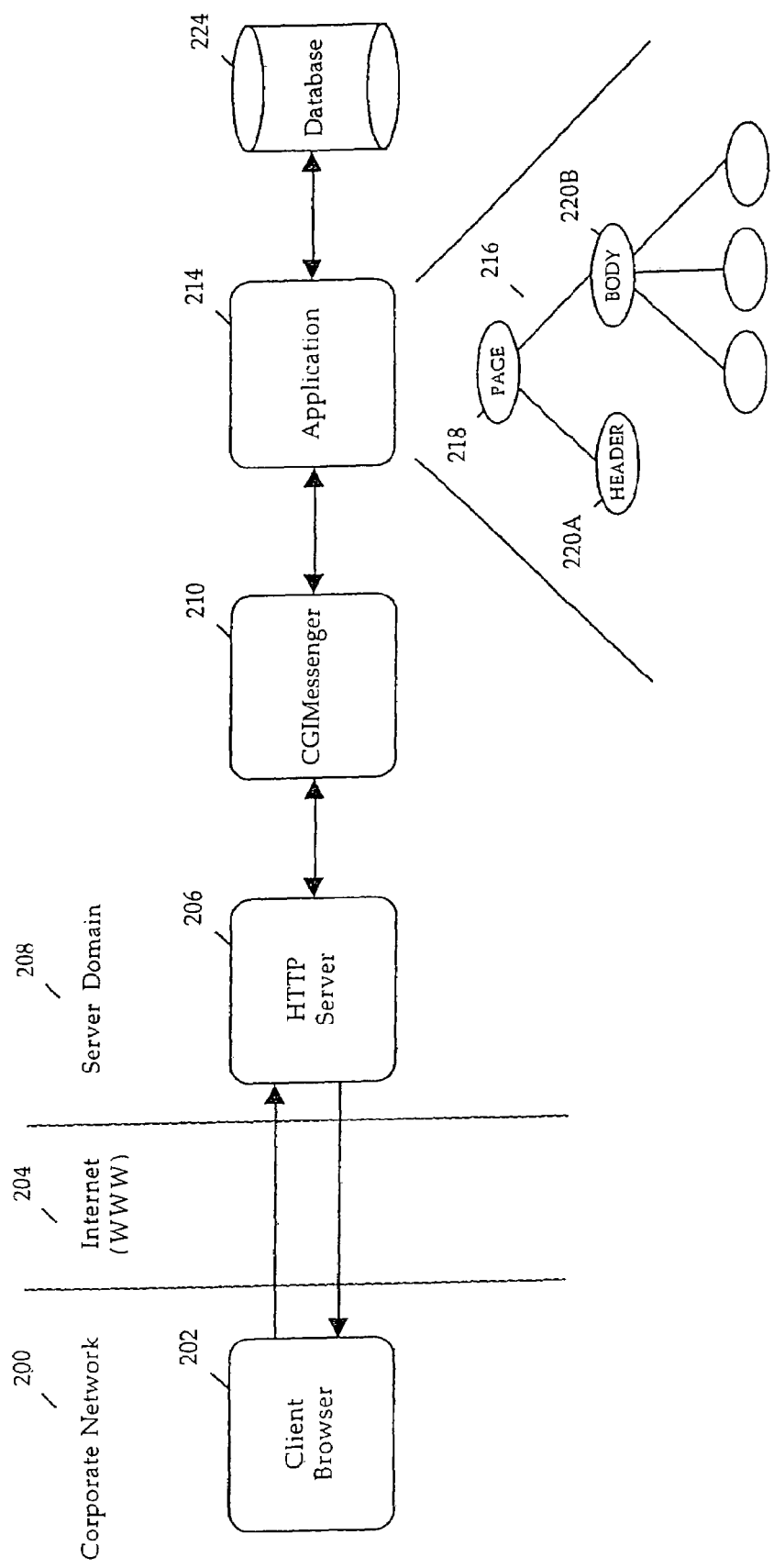
FIG. 2 provides a block-level diagram that illustrates components of the present invention.

The present invention provides the ability to access an application using any interface. For example, a client can access the same application via the Internet using a system running Windows, MAC/OS, Sun OS, NextStep, etc. Referring to FIG. 2, client 202 is resident on a corporate network 200. Corporate network 200 is a local area network comprised of personal computers such as client 202, for example. Client 202 executes a browser such as Netscape or Mosaic to interface with World Wide Web (WWW) 204. The browser executing on client 202 displays HTML documents transmitted to client 202 via WWW 204. When the client browser submits a request typically an HTML page, it is transmitted via WWW 204 to HTTP server 206. An attribute of the submitted form is a Universal Resource Locator (URL). The URL specifies procedures to be executed and/or data input by the user.

HTTP server 206 can service the client request by, for example, retrieving a return form or file (specified by a URL contained in the HTML document) and transmitting it to client 202 via WWW 204. Further, HTTP server 206 can initiate a program identified in the URL. In the preferred embodiment, the URL specifies CGIMessenger 210 to service the client request. CGIMessenger 210 uses the Common Gateway Interface (CGI) protocol, for example. CGIMessenger 210 can execute on the HTTP server 206 or another server connected to HTTP server 206, for example. The following provides an example of a URL:

http://www.next.com/cgi_bin/cgimessenger/app_name/rcv_form/send_form

The above example is for illustration only. Any URL format can be used with the present invention. The URL in the above example has multiple parts. The first part, "http:" specifies the protocol to be used. Other examples of protocol include "ftp:", "gopher:" and "wais". The next part specifies the Internet domain name of the server. In this case, the Internet domain name of the HTTP server is "www.next.com". The next part, "/cgi_bin/cgi_messenger" specifies the path and filename of the desired resource. The resource can be a file, form, or program, for example. In this case, the resource is a common gateway interface program that is used to route requests to applications. The application that processes the client request is specified in the URL with the "app_name" specification. The names of the receiving form (e.g., the form containing the client request) and the sending form (e.g., a reply to the client request) can be included in the URL.

A client request can result in the invocation of application 214 in the server domain 208, for example. The client request is received by the HTTP server 206. HTTP server 206 initiates CGIMessenger 210. To service the client request, CGIMessenger 210 communicates with HTTP server 206 to obtain information regarding the client request. For example, CGIMessenger 210 obtains any information that accompanied the user request such as form and/or application names and/or user input. The form names can include the name of the form that was submitted to initiate the client request as well as a return form.

The application name identifies the application that services the client request. If an application is specified, CGIMessenger 210 transmits the client request and corresponding information transmitted from HTTP Server 206 to application 214. Application 214 can execute on the same or different server as CGIMessenger 210 and/or HTTP Server 206, for example. Application 214 executes an interaction flow to satisfy the user request. Application 214 can access an external data source such as database 224. Database 224 can be resident on the same server as application 214. Alternatively, database 224 can be resident on a separate server (e.g., a separate database server).

The present invention can service multiple levels of interaction with the client browser. A simple hypertext request (e.g., a request for another form specified in the request) is serviced by HTTP Server 206 by returning the specified form. A simple hypertext request can be, for example, a request for a static HTML page (e.g., a page that contains static information that is defined prior to execution) that does not have any associated logic.

The present invention provides the ability to satisfy more sophisticated requests. For example, the present invention can be used to access a Web page (e.g., an HTML Web page) that is dynamically generated using complex queries (or other data retrieval mechanisms) to retrieve data and dynamically generate an HTML page using complex logic. For more sophisticated requests, the present invention can execute logic such as CGIMessenger 210 and application 214, for example, to process a client request. The application preferably includes an object class hierarchy that can be implemented in any object-oriented language such as objective C, SmallTalk or JAVA. Objects (e.g., Web page definitional objects and control objects) dynamically generate a Web page and manage client interaction via the Internet and WWW.

Internal Application

A powerful feature of the WWW is its accessibility virtually anywhere in the world using virtually any hardware/software platform. Using the present invention, this feature of the WWW can be used to allow an application such as a corporate (or local) application to be accessed using any workstation that provides access to the Web regardless of its location. The present invention can be used to allow an internal, corporate application to be accessed any place in the world via any hardware/software platform that is capable of accessing the Internet.

Figure 3A:
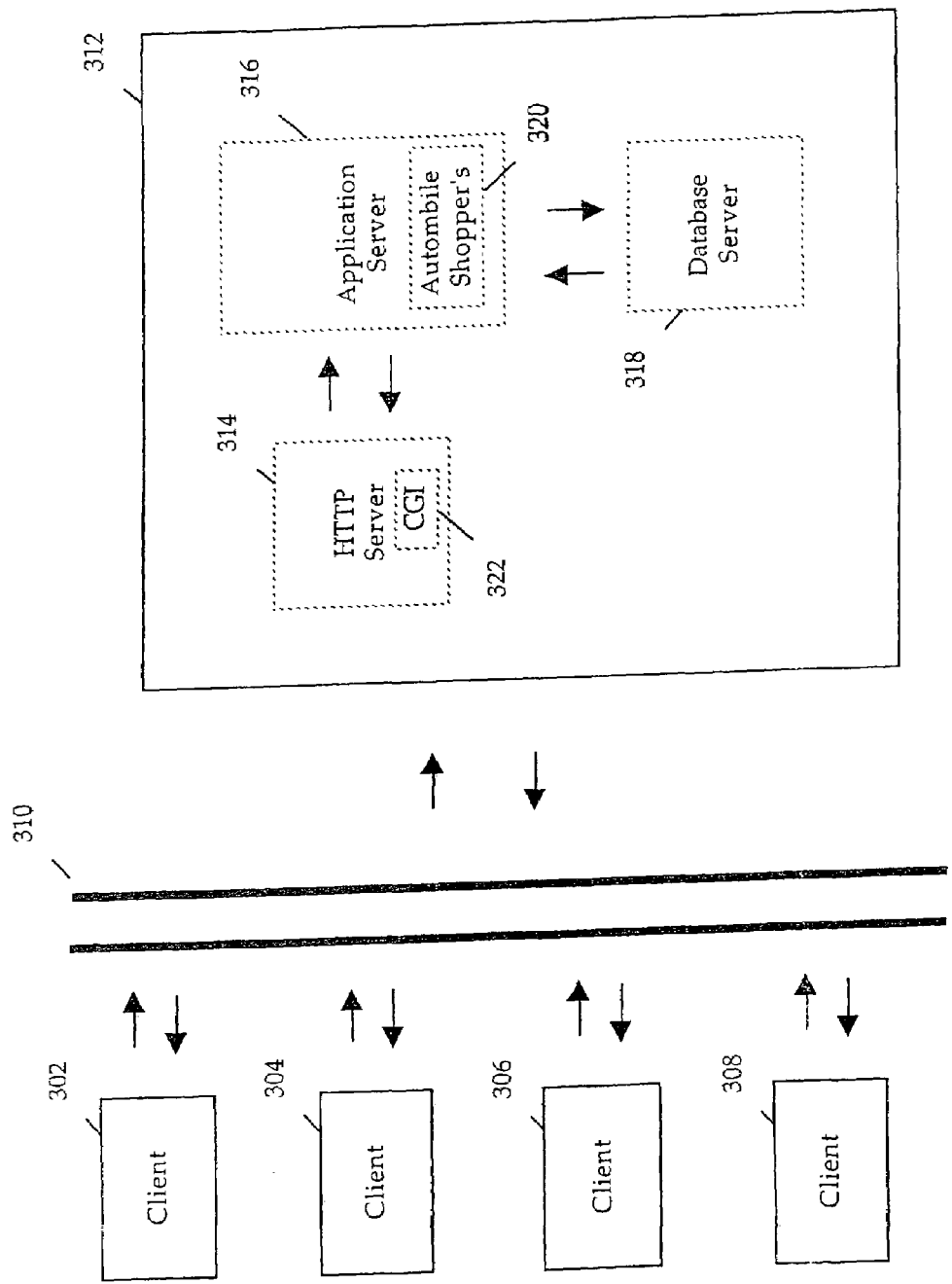
FIG. 3A provides a block-level diagram for accession a corporate application on the World Wide Web (WWW) using the present invention.

The present invention provides tools to implement an application that can be accessed via the WWW. Further, the present invention provides tools to manage the interaction between a WWW client and the internal application. FIG. 3A provides a block overview of an internal application that is accessed via the Internet.

Clients 302, 304, 306, and 308 access WWW 310 using any WWW-capable workstation. For example, client 302 can be an Intel-based workstation running Windows and a browser such as NetScape Navigator. Client 304 can be a 68K workstation running MacOS and Mosaic WWW browser. Client 306 can be an RISC machine running UNIX and a proprietary browser. Client 308 is an Intel-based workstation running DOS and the DosLynx browser.

Requests submitted by clients 302, 304, 306, and 308 to HTTP server 314 are transmitted to HTTP server 314 via WWW 310. HTTP server 314 runs in the corporate network 312. A client request is forwarded to application server 316 via HTTP server 314. Application server 316 runs one or more internal applications.

The present invention accommodates the needs of an internal application. For example, using the present invention an internal application can provide a dynamic user interface that can respond to user input. Further, an internal application is able to access an external data source to store the application's data. State information can be retained to allow the internal application to allow the application to maintain open sessions with multiple users capable of processing multiple transactions in any order.

Development of an internal application can be efficient and flexible. An internal application can be written using complex logic and complex queries. Developers have the ability to incorporate pre-existing modules into the internal application. Modules are self-contained to facilitate module maintenance and interaction.

An internal application running on application server 316 has the ability to respond to the client request using the capabilities of the present invention. The Web page definition returned to a client can be generated from a pre-defined template or templates. Alternatively, all or some portion of the definition can be dynamically generated by the application. The contents of the Web page can contain data retrieved from an external data source (e.g., such as database server 318), or state information maintained by the application. Custom logic and declarations can be associated with each Web page.

The application can make use of object technology to generate client responses. For example, the elements of a Web page definition are objectified. Instances of definitional elements are instantiated during execution to manage their respective portions of the Web page. Control objects are associated with definitional elements to facilitate the flow of information to and from external data sources. A special type of control referred to as a repetition control allows a group to be activated multiple times. Each activation of a group of definitional elements generates one occurrence of a repeating portion of the Web page.

Definitional elements can be grouped together. A group object class provides the ability to access these definitional elements as a group.

Self-contained modules, or components, can be accessed to provide additional definition for the Web page. A control object is associated with one of these modules to manage its integration into the rest of the Web page definition. The self-contained modules can be shared by one or more Web pages in a single application and/or across multiple applications executing on application server 316 (or any other server).

Figure 3B:
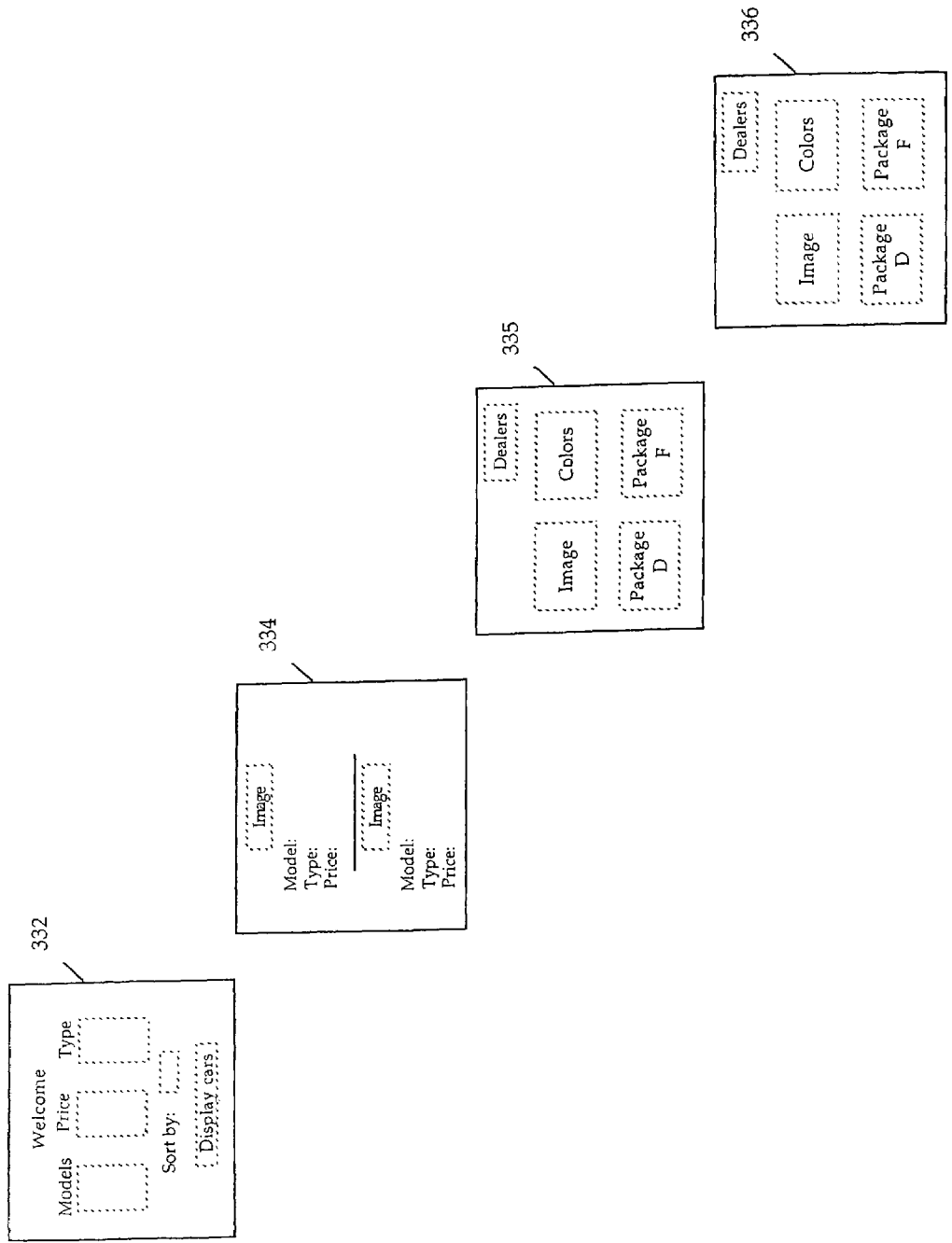
FIG. 3B provides an example of Web pages generated by an Automobile Shopper's application accessed via the WWW using the present invention.
Figure 4:
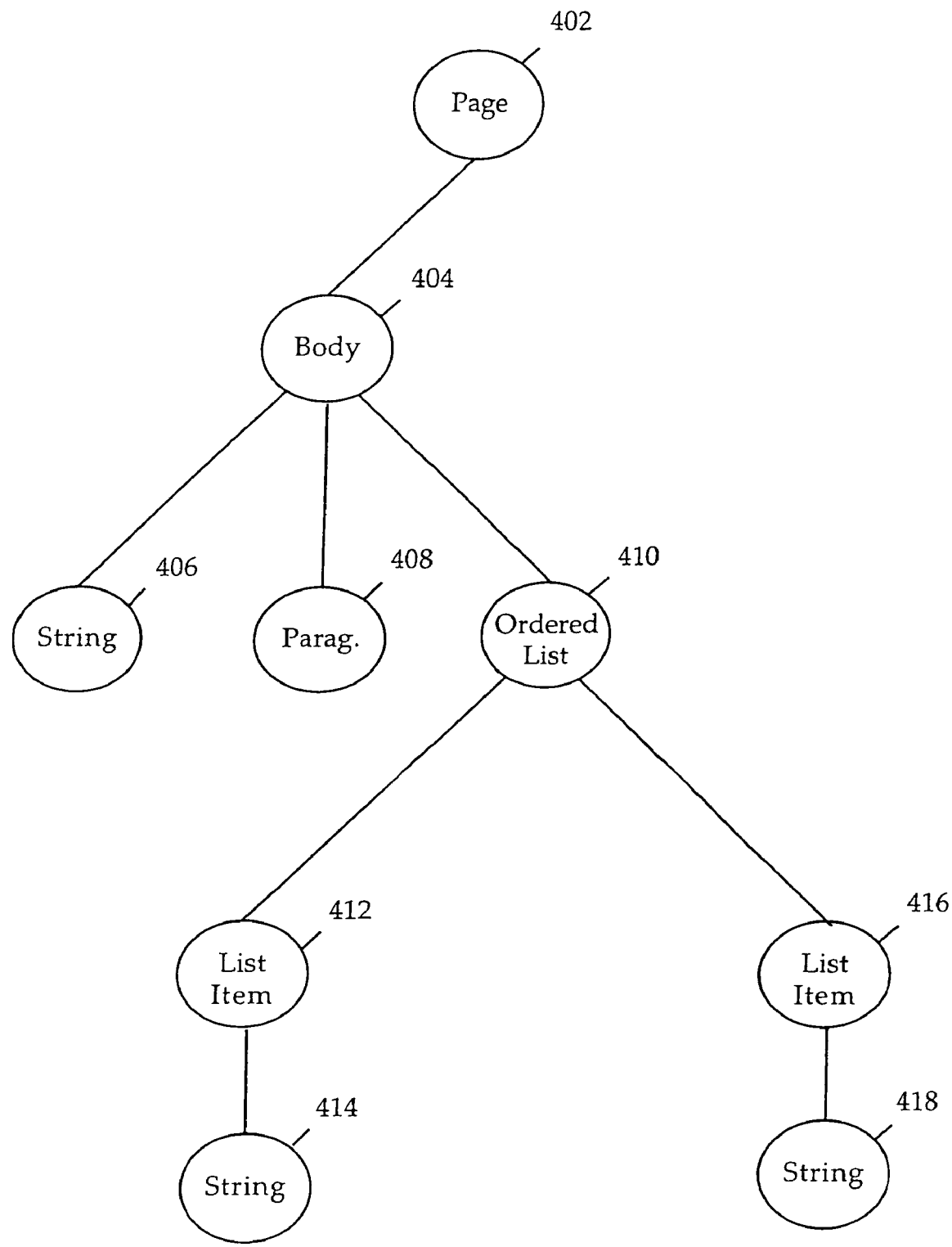
FIG. 4 provides a diagram of the object tree.

Internal application 320 can be, for example an Automobile Shopper's application. It can be used by a prospective car buyer to select a car. A car shopper accesses the Automobile Shopper's application. The application provides a series of screens (i.e., Web pages) based on user-input that are designed to facilitate the selection and purchase of an automobile. FIG. 3B provides Web pages that are generated using application 320 and displayed at a client workstation such as clients 302-308.

The content of the Web pages seen by the shopper are determined based on the shopper's input. A Web page can be generated from a pre-built or static definition. However, it would be necessary to store a definition to accommodate each selection or combination of selections made by the shopper. The use of static page definitions may be acceptable where the number of pages is limited. However, where the input can result in a wide variety of Web pages, the use of static definitions is very inefficient. For example, each static definition must be stored and catalogued for later access. Where the content of the page can vary based on the input, the use of dynamic page definitions is more efficient. There is no need to store a definition for every possible Web page when a page is dynamically generated.

Referring to FIG. 3B, the Automobile Shopper application provides an example of the use of dynamic pages. "Welcome" page 332 provides input areas that allow the shopper to identify model, price and type of the car(s) in which the shopper has some interest. After specifying the characteristics, the shopper submits the page. In response, the shopper expects a page that displays those cars that meet the criteria specified by the shopper in "Welcome" page 332. The response page is based on the particular input provided by the shopper.

HTTP Server 314 receives the "Welcome" page. The "Welcome" page contains a URL that specifies Automobile Shoppers application 320. HTTP Server 314 forks a CGI interface program 322 (e.g., CGIMessenger). CGI program 322 identifies the application specified in the URL. CGI program 322 passes the shopper's input contained in the "Welcome" page to the application 320 running on application server 316 via corporate network 312.

Application 320 receives the user-specified characteristics. Custom logic associated with Welcome page 332 can be used to determine the next page to be sent to the shopper.

Objects associated with the next page are initiated. Custom logic associated with the next page is executed to build a select statement to retrieve data from an external data source (e.g., database server 318). To fetch the data from the external data source, the application builds a qualifier object, for example. A data source object acts as an interface to the database. A data source object has fetch, insert, update, and delete operational capabilities.

The application sends the qualifier object and fetches all the data from the database. An array of data is returned from the fetch operation. For example, the array contains all of the models of cars that are within the price range and type specifications provided by the shopper in the "Welcome" page. Using the data retrieved from database server 318, the application along with the objects associated with the next Web page generate the definition for Web page 334.

Web page 334 contains a repeating portion that is comprised of an image, model data, type information, pricing. A group can be used to generate the repeating portions of Web page 334. The group generates a template that can be used to generate each repetition. The group includes objects that correspond to definitional elements in the repetition. The group is activated for each repetition. When the group is activated, the objects contained in the group are activated. The objects generate the definitional elements (e.g., HTML statements) that define one repetition. Referring to page 334, an activation activates a group and the objects contained in the group to generate HTML statements that include definitions for the image, string, and input fields contained in the first half of the page. A second activation of the group generates the bottom portion of Web page 334.

The shopper selects one of the models by clicking on the image of the car. The shopper expects more detailed information about the specific model selected in response to the selection. In response to the shopper's selection, the application and objects associated with the Web page are used to fetch information about the selection from database server 318. The objects generate the definitional elements that are used by the shopper's browser to display Web page 335.

A shopper selects an option package (e.g., "Package D" or "Package F"), select a color for the car, or ask for a screen that contains a list of dealers that have the selected car in stock. For example, if the shopper selects a color for the car, the custom logic associated with page 335 determines that the same page definition can be used to generate a response page. An image of the car in the color selected by the shopper can be inserted into the page definition and sent to the shopper's workstation. The browser executing on the shopper's workstation displays Web page 336.

The Web pages in FIG. 3B are generated dynamically based on a shopper's input. A Web page in FIG. 3B can be generated using resources associated with the page. For example Web page 332 can have an associated set of resources. These resources can include none or any combination of: template(s), association(s) and custom logic.

A template provides an initial definition for the Web page. It is used to generate a tree of objects that can be used to generate the Web page. The template and corresponding object tree can be modified dynamically bases on the associations and custom logic. An association can provide a declaration of a definitional element that is to be inserted into the object tree. An association can further be used to modify properties of objects in the object tree. The custom logic is preferably implemented using a script or interpreted language.

Script

The application (e.g., application 214 in FIG. 2 or application 320 in FIG. 3) can make use of procedures to service a client request. In the preferred embodiment, application 214 uses objects and other procedures to provide logic to satisfy a client request. A scripting language can provide logic, for example. In addition, object instances can provide behavior to process a client request.

A script is a type of program that consists of a set of instructions that is read and interpreted by another application. An instruction is an expression that conforms to the rules and syntax expected by a script interpreter. A script language (set of script instructions) may include simple control statements such as loops and if/then expressions.

Since the language does not include complex constructs, the language is easy to master. As with other interpretive languages, a developer does not have to perform steps to translate a script into machine-readable code. Even though a script is interpreted at runtime, it is not considered to cause any degradation in the overall response time (the actual network response times are the primary concern). Therefore, scripts are typically used to provide the logic associated with a Web page.

Practical Extraction and Reporting Language (PERL) is one example of a scripting language. Alternatively, an objective C (interpreted or compiled) can be used. An interpretive objective C is used in the preferred embodiment. However, any programming language can be used with the present invention.

Element Objects

Objects provide behavior and data to facilitate a client request. Preferably, object classes are defined to objectify the elements that define a Web page. For example, a Web page that is defined using HTML can be generated using an object class library that includes HTML element object classes. The present invention is described herein with reference to HTML, however, object classes can be defined to accommodate any type of definitional constructs or syntax that can be used to define a Web page (e.g., JAVA, PDF, VRML, etc.).

By objectifying Web pages it is possible to gain the advantages of object-oriented programming with Web pages. These advantages include rapid application development through object reuse, transparent distribution, simplified maintenance, and scalability. These advantages can be achieved using the common interface provided by Web browsers.

Objectifying HTML elements provides the ability to programmatically manipulate HTML documents. The properties of each element are stored in instance variables of the associated object. Each object class can include methods to manipulate the HTML element within an HTML document. The mapping of HTML elements to objects is more fully described in the U.S. Patent Application entitled "Method and Apparatus for Generating Object-Oriented World Wide Web Pages", Ser. No. 08/515,057, filed on Aug. 15, 1995, now U.S. Pat. No. 6,651,108, assigned to the assignee of the present invention, and incorporated herein by reference.

The HTML elements that define a Web page can be included in a single ASCII file. A file that contains HTML elements is referred to as an HTML template. An HTML template can include a complete definition of the Web page. However, an HTML template may define a subset of the Web page. Two or more HTML templates that define portions of the Web page can be combined to provide a complete definition. The following provides an example of the contents of an HTML template:

TABLE ONE

```
<HTML>
    <BODY>
    This is a list of employees:
    <P>
    <OL>
    <LI> James </LI>
    <LI> Mary </LI>
    </OL>
    </BODY>
</HTML>
```

The HTML template in Table One provides one example of a template that can be used with the present invention. It includes the HTML elements: HTML, BODY, Paragraph (P), Ordered List (OL), and List Item (LI). The present invention defines a class for each HTML element. An object class defines instance variables to store information associated with the HTML element such as attributes, or properties, of an HTML element. Methods can be defined to manipulate an HTML element to render (i.e., generate) an HTML document, for example.

Preferably, the objects in an object tree are instantiated based on pre-defined object classes. Object classes are defined to manipulate and generate HTML elements in an HTML document. The name of the object class can mirror the names of the corresponding HTML element to provide an easy association between the two. Alternatively, any mapping scheme can be used to map an HTML element to an object class. Instance variables can be used to store property information defined by properties in the HTML element statement. An object class can further contain instance variable declarations to store other information associated with an HTML element.

An object class can have behavior that can be used to manipulate the HTML document. For example, an object class may have a method that varies the display characteristics of the HTML element based on the outcome of some Boolean logic. Further, instance variables can be used to provide a pointer to scripts used with the HTML page.

Referring to FIG. 2, application 214 includes objects 216. Objects 216 correspond to the HTML elements that define a WWW page. Objects 216 are arranged in a tree structure that corresponds to the hierarchical structure of the HTML elements that they implement. To render an HTML document, application 214 sends a message to the root object 218 to render itself. In response to this message, root object 218 renders the corresponding HTML element(s). Root object 218 sends a message to its children, objects 220A 220B, to render themselves. This process is continued until all of the nodes in the object tree have been processed.

Appendix A provides a list of some object classes for HTML elements. Additional or modified class definitions can also be used with the present invention. A library of object classes are preferably pre-defined. The object classes described above are used in conjunction with HTML elements. Other object classes can be used with the present invention to accommodate other definitional elements used in Web page that includes JAVA and PDF, for example.

State

A web session has consisted of a series of independent transactions. It is stateless. HTML provides a mechanism to store a limited amount of state information as part of the HTML page. The present invention provides a mechanism to store state information independent of the Web page. State information maintained by the present invention facilitates the use of the WWW as a vehicle for accessing a local application, for example. The states provided by the present invention provide the ability to implement virtual applications, sessions, transactions, etc.

State, or context, typically refers to the condition of processing and/or information at a given instance. In the preferred embodiment of the present invention, state information has associated duration and scoping designations. State information is preferably contained in the properties of objects. Objects are said to be contained within the state. A state's persistence relates to the persistence of its objects. Object persistence relates to the degree of permanence of an object. For example, an object can be created for the duration of an application's execution, or for some shorter period of time. Table Two provides examples of persistence levels and the corresponding context duration and scope that are preferably used with the present invention:

TABLE TWO

| Level | Duration | Scope |
|---|---|---|
| Local | The life of an object is the same as that of the procedure or method in which it was created | Accessible within the procedure or method |
| Transaction | An object exists during the processing to satisfy a client request (e.g., generate and transmit a Web page) | Accessible by objects involved in the current transaction(s) |
| Page | An object exists for the duration of transaction (e.g., an object exists during the generation of a page and is available to process the page when it is returned by the client) | Accessible by objects involved in the current transaction(s) or in the next transaction(s) of the same session |
| Session | Once an object is created in a client session, it remains for the remainder of the session | Accessible by objects involved in any transaction of a session |
| Global | An object created by an application exists for the remainder of the application's processing | Accessible by objects involved in any transaction of any session of an application |

The context levels provided in Table Two are for purposes of illustration. Additional or different levels supplement or replace these levels to define state and/or object duration and scope without departing from the scope of the invention.

In the preferred embodiment, state information is retained in properties of objects. By specifying the level of persistence of an object containing state information, the level of persistence of the state information is also specified. State information is maintained at the local, transaction, page, session, or global levels, for example. A client's login password can be retained as state information at the session level, for example. Thereafter, the client does not have to enter the password to access an application during that session. Global level information is shared across sessions, clients, and applications. For example, a connection to a database can be used at the global level by multiple sessions and applications. One of the levels (e.g., local) can be used as a default that is used when a level is not specified.

Each level has an associated scope that defines the scope or accessibility of the level's context information. For example, global-level context information is accessible by objects involved in any transaction within any session of the application. Session-level context information is accessible by objects that are involved in the processing of a transaction within the particular session. Objects that process a current or next transaction (i.e., the transaction that follows the current transaction) have access to page-level context information associated with the current transaction's page. Objects involved in the generation of a Web page can access that transaction's transaction-level information. Context information that is local to a procedure or method is accessible within that procedure or method.

By maintaining context levels, it is possible to maintain context information that is unique for each application and session within each application. Thus, it is possible, for example, to form virtual applications and sessions, for example. For example, context information associated with a session can be designated as session-level context information thereby making the information accessible to objects or other logic that are involved in any transaction performed within the session. Each session can therefore have its own context information. An application can retrieve a particular session's context information to process a request. Similarly, the same application can access another session's context to process another request.

Various techniques can be used to specify a context level. In the preferred embodiment, a context level is specified in the declaration section of a scripted procedure or other logic. The particular syntax used in the declaration is dependent on the language used to define the logic. The following provides an example of declarations using an objective C syntax:

transaction a;
page b, c;
global t, u, v;

In the above examples, the keywords "transaction", "page", and "global" define the level of persistence for the variables that follow the keywords. Thus, for example, the object "a" has a "transaction" level of persistence. Therefore, "a" exists during the processing of a client request, for example. Objects "b" and "c" have "page" level persistence and remain in existence to receive a page returned from a client, for example. The result of the declaration statement is to put objects "b" and "c" in the page-level context. The "global" objects "t", "u" and "v" are accessible for the life of an application and are shared among sessions, for example.

In the examples above, the level of persistence is specified in a declaration statement. Alternatively, the level of persistence can be defined using APIs in interpretive C, for example. A context object is used to manage different pools of objects (i.e., global pool, session pool, transaction pool, etc.).

A "contextSetObjectForKey" message is sent to the context object. The message tells the context object to set an object (named in the message) in an object pool according to a context level specification. If a context level is not specified, the context object searches the object pools for an object with the same name. If it does not find an object with the same name and no context level is specified, the context object inserts the object in the default pool (e.g., local context level).

The context retrieves objects from the object pools using criteria such as object name and pool designation. The context retrieves the object(s) for the requester. The context acts as the manager of the name space.

This functionality is also implemented by the script interpreter used in the preferred embodiment when a context-level keyword (e.g., global, page, transaction, etc.) is encountered.

State information is retained using a storage means. Various storage policies can be used with the present invention. The actual means of storage is preferably programmatically alterable. A storage policy can be specified programmatically on a context basis or on an object basis, for example. A default storage policy can be set for all of the objects that have session-level persistence, for example. The default policy can be overridden by a policy specified for an object having session-level persistence. Table Three contains examples of storage policies:

TABLE THREE

| Policy | Description |
|---|---|
| Page | State information is archived with the Web page using an HTML "hidden" field |
| Database | State information is archived in an external data source such as a database |
| Memory | State information is archived in memory |
| File System | State information is archived to a file system |

Other storage policies in addition to, or as a replacement for, those specified in Table Three can be used with the present invention. Since the state is preferably stored in objects, a storage policy specifies the archival policy used for an object containing state information. A "page" storage policy results in the object using this policy to be archived within a Web page in HTML "hidden" fields, for example. Alternatively, a token can be stored in the Web page that can point to the object(s), for example.

Objects are archived in a database using a "database" storage policy. A second storage policy can be used to store a database key to access the objects archived to the database. Using the "memory" storage policy, a state is associated with a unique client so that an application can service multiple sessions for multiple clients, for example. Using the "file system" storage policy objects are archived to disk storage, for example. Objects are stored in the file system by, for example, maintaining the objects and their corresponding properties in files in the file system.

Using any storage policy, it may be necessary to perform a garbage collection process to eliminate state information that is no longer needed. A time stamp is used to facilitate garbage collection. One method of garbage collection is described in U.S. Pat. No. 5,355,483 entitled Asynchronous Garbage Collection issued Oct. 11, 1994, assigned to the assignee of the present invention, and incorporated herein by reference.

Group Object

There is a standard set of HTML elements that are understood by most Web browsers. Some Web browsers offer additional HTML elements or extensions. These extensions provide additional functionality. However, because extensions are not part of the standard HTML, one browser's HTML extension may not be interpretable by another browser.

The extensions offered by client browsers are interpreted on the client side. The present invention provides an extension to HTML that is used on the HTTP server side. The HTML extension is filtered out before a Web page is sent to a client browser. It is used to interpret an HTML template and to render an HTML document before is transmitted to the client browser. Because HTML extensions are not sent to the client browser, there is no need for a client browser to support these extensions. Thus, existing client browsers that support the standard HTML can be used to display HTML documents using the present invention.

The present invention uses an extension to the standard HTML known as the group extension. The group extension provides the ability to combine HTML elements or statements in a single block. Further, the group extension provides a link between an object that implements an HTML element and an object that implements a data item stored in a data source external to the WWW application. A name attribute of the group extension provides the ability to identify the block, or group, by name. The name attribute can be stored in a hash table. During processing, the group identity can be retrieved and used to traverse an object tree.

The group extension also ensures the scoping of named elements (i.e., elements that have a name by virtue of a name attribute). A group object maintains a hash table that includes the named elements which are its members. The group element scopes the named elements within itself. Therefore, two elements having the same name in different groups are distinguishable. Each one is scoped to its respective group. For example, a group element named "Nico" contained within a parent group named "Employee" is distinct from a group named "Nico" within a parent group named "Tourist".

An NSWTAG marker is used to identify the bounds of the group in HTML. The following is an example of HTML including the group extension:

TABLE FOUR

```
<HTML>
  <H1><NSWTAG NAME="GREETING"></NSWTAG></H1>
  <NSWTAG NAME="SELECT_FORM">
    <FORM>
      ...
      <OL>
      <NSWTAG NAME="WEBPEOPLE">
        <NSWTAG NAME="FN"> <INPUT TYPE="text"></NSWTAG>
        <NSWTAG NAME="LN"> <INPUT TYPE="text"></NSWTAG>
      </NSWTAG>
      </OL>
      ...
    </FORM>
  </NSWTAG
  ...
</HTML>
```

The group extension is identified by the <NSWTAG> and </NSWTAG> delimiters. Other techniques can be used with the present invention to identify a group element in HTML, or other Web page definitional syntax. A NAME property specifies the name of the group. For example, a "GREETING" group extension is defined within the H1 HTML element. A group extension can contain other HTML definitions including other group definitions. For example, the "SELECT_FORM" group contains: FORM, OL (Ordered List), "WEBPEOPLE" group, "FN" group, INPUT, "LN" group, and INPUT HTML elements. The "WEBPEOPLE" group is nested within an OL HTML element within the "SELECT_FORM" group extension. The "LN" and "FN" group extensions are nested within the "WEBPEOPLE" group.

The name property of a group HTML element is used to link a group to an association.

Associations

An association is used in combination with the group extension. An association provides declaration information for static HTML elements where appropriate. It further provides binding information. An association is declared in an associations file.

An association can contain a declaration for an HTML object. Properties of the HTML object can also be defined within the association. Values of properties declared in the association are used to populate the properties in an instance of the HTML object class.

An association provides binding information to bind, for example, variables, objects, Web page definitions, and scripts to one another. For example, binding information can bind an HTML object to an object that contains corporate data, or data retrieved from an external source (e.g., an Enterprise Object, or "EO"). An association binds a script with a Web page definition, for example. Binding information is preferably contained in an association as a name or label.

Table Five provides examples of associations for the group extensions defined in Table Four.

TABLE FIVE

```
SELECT_FORM:NSWForm {action=OnSelection};
  ...
SELECT_FORM.WEBPEOPLE:NSWRepetition {list=web_dept;
item=employee};
SELECT_FORM.WEBPEOPLE.FN:NSWInput {value=employee.fn};
SELECT_FORM.WEBPEOPLE.LN:NSWInput {value=employee.ln};
  ...
GREETING:NSWString {value="Welcome"};
```

The association syntax provided in Table Five is for illustration purposes only. The particular syntax used can vary without departing from the scope of the present invention.

An association provides information that can be used with its corresponding group HTML element. The information contained in an association is preferably contained as fields. A label, or name, field (the string to the left of the colon in the above example) provides a link to the group declaration in the HTML template. An HTML object declaration field (the field to the right of the label field) identifies an HTML object class to instantiate. The HTML object class instance is inserted in the object tree based on the information contained in the label field. Property fields of the association contain values to populate properties of the HTML object instance.

Figure 7A:
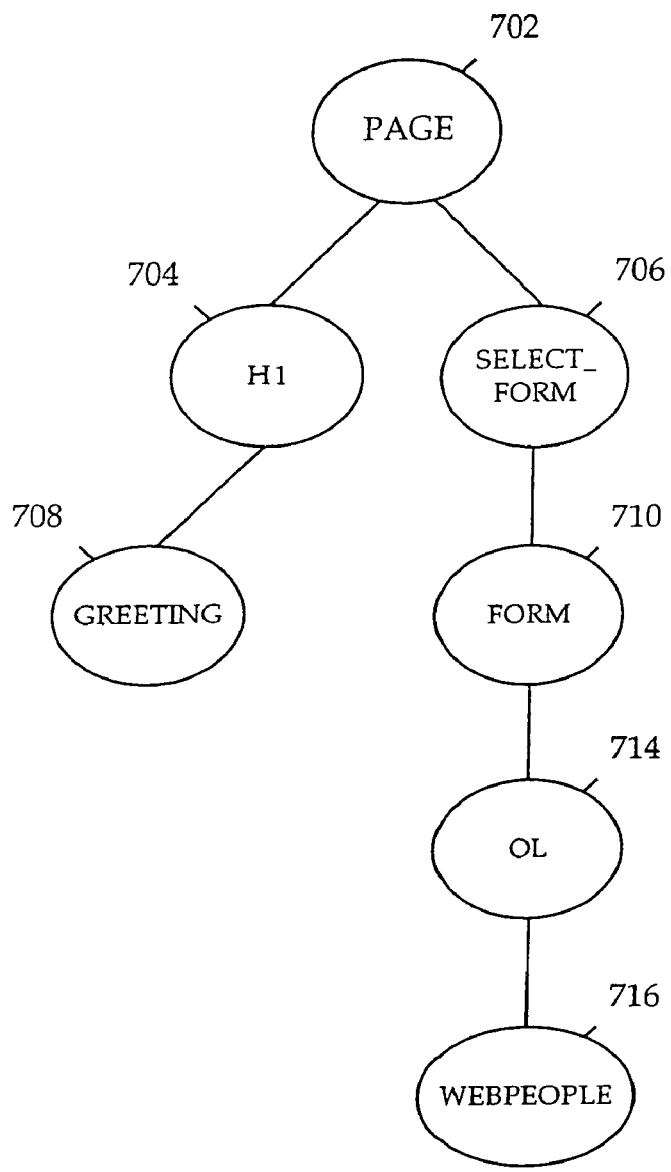
FIG. 7A provides the object tree that is generated when the HTML in Table Four is parsed.

When an HTML template is parsed, the HTML template and associations information along with the logic (e.g., in the application and scripts) are used to generate an object tree. FIG. 7A provides an object tree that is generated when the HTML template in Table Four is parsed.

Page object 702 is the root of the object tree. A header object 704 (i.e., H1) is a child of page object 702. The "GREETING" group object 708 is a child of header object 704. The name attribute of the corresponding group HTML element provides a link to an association. Within page object 702, is a group object 706 with a "SELECT_FORM" name attribute. The "SELECT_FORM" group object 706 contains FORM HTML object 710 and OL HTML object 714. Within the OL HTML object 714 is a group object 716 with a name attribute equal to "WEBPEOPLE". The "WEBPEOPLE" group object 716 is instantiated from the group definition.

An association can be used to modify an object tree by adding objects to the tree or modifying the objects that already exist in the tree. For example, an HTML object, or element, declared in an association can be inserted in the object tree. Property values that are declared in the association can be used to modify an existing object's properties.

Component

A component is a construct that can be reused or shared (e.g., across applications). A component can have associated resources (e.g., template, associations, and custom logic) that are owned by the component. These resources are stored, for example, in a file system with a known search path. Alternatively, a component's definitions and logic can be determined dynamically at runtime. A web page can be defined using the resources owned by components. Components provide the ability to use multi-content document (i.e., documents generated using different types of definitional constructs).

A component is an independent element that owns its resources. It can have custom logic. A component can provide a definition for a Web page using a language such as HTML. Other languages or constructs used to define a Web page can also be used. Thus, for example a component can be defined using JAVA, PDF, VRML, or ACROBAT. Components can be combined to define a single Web page regardless of the language used to generate the definitions.

For example, a Web page can be defined using an HTML component (i.e., a component that contains HTML element definitions), a PDF component (i.e., a component that contains PDF), and a VRML component (i.e., a component that contains VRML). Each component has its own resources. Further, each component generates and owns its own object tree of static elements and inserts its tree into the object tree that is used to generate the page. Components therefore provide the ability to have multi-content documents, or Web pages. Multi-content documents are documents that are defined using multiple types of definitional constructs or syntax such as HTML, PDF, VRML, etc. Thus, a Web page can be generated by integrating multiple components independent of the definitional constructs used in each component.

As with a page, a component can have a set of resources associated with it. The resource set can include, for example, association(s), template(s), and/or custom logic. However, it not required that all three of these resources be associated with a component. A component can have one or none of these resources associated with it, for example.

Controller

A control object class, or controller, is used in the preferred embodiment to provide object cover for a component. Controller objects are dynamic elements that have associative behavior, or custom logic. A root control class is provided that is preferably an abstract class (i.e., objects are not instantiated from this class). The root control class defines data and behavior that is inherited by subclasses of the root class. The root control class encapsulates behavior used by a component. Such behavior includes the ability to: 1) associate with a corporate, or enterprise, object; 2) generate and own static element(s); and 3) insert static element(s) into an object tree.

In the preferred embodiment, the root control class contains subclasses. One subclass is for object classes that control HTML elements. This branch is referred to as the object control branch, or subclass. For instance, stringControl and imageControl object classes can be used to control the NSWHString and the NSWHImage object elements, respectively. A stringControl object instance instantiates an NSWHString static HTML element and inserts it in the template. A controller class is preferably provided for every element of the definitional syntax (e.g., every HTML element).

Figure 6A:
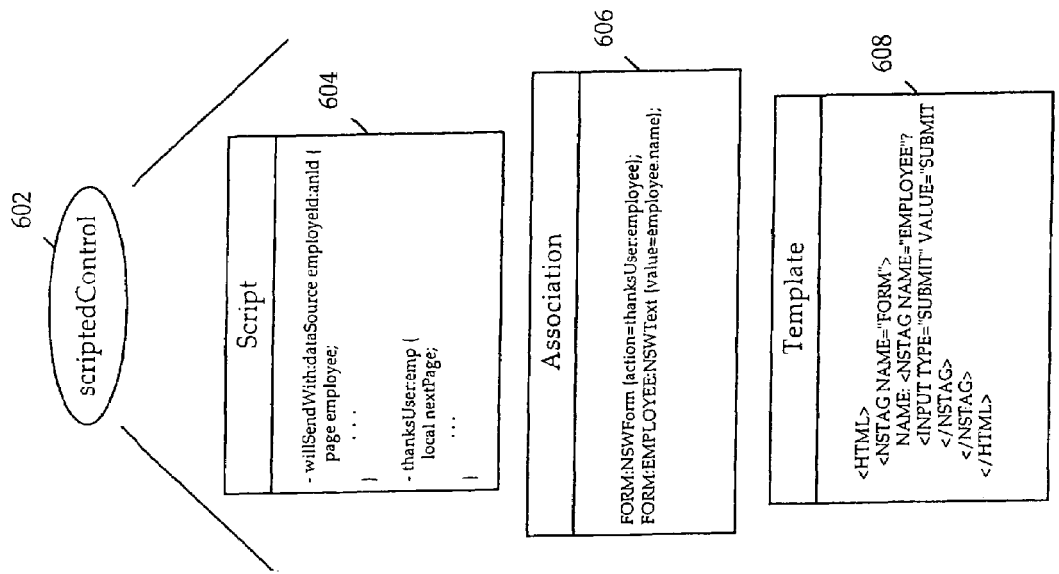
FIG. 6A provides an example of resources associated with a control.

Another subclass of control objects is referred to as the scriptedControl class. This class is used to manage a page or a component of a page (a page can be comprised of one or more components). Referring to FIG. 6A, for example, an instance of the scriptedControl object class, scriptedControl object 602, owns the resources that include script 604, association 606, and template 608. A scriptedController (an instance of the scripted control class) is instantiated when a new page is created or when the page needs a component, for example. When a page is defined by script 604, associations 606 and template 608, scriptedControl object 602 is a control for the page. Alternatively, script 604, associations 606 and template 608 define a portion of a page. In this case, scriptedControl object 602 is a control for a component.

Figure 6B:
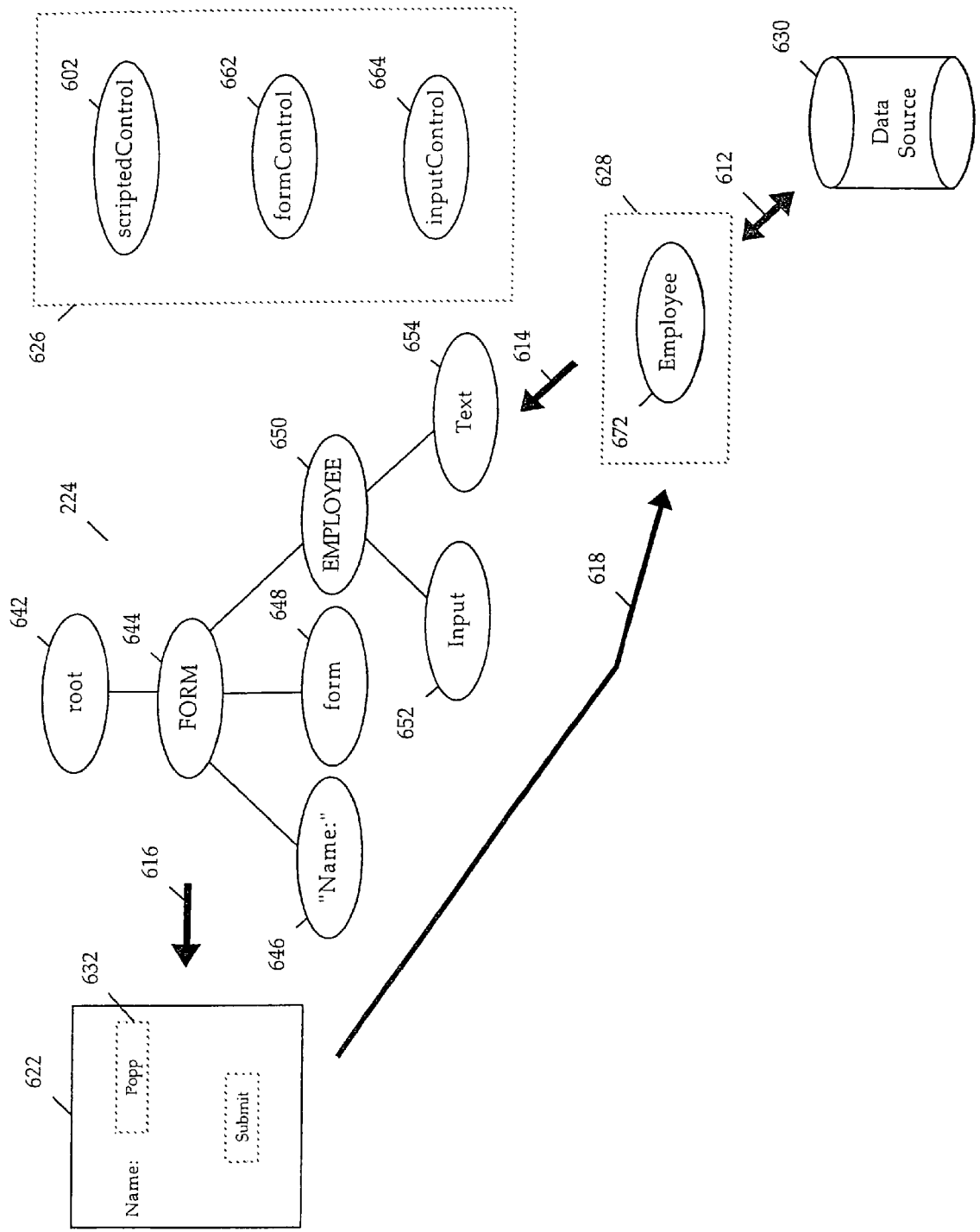
FIG. 6B provides a block-level diagram associated with component processing.

The scriptedControl object 602 includes behavior to generate a tree of static elements such as object tree 624 in FIG. 6B. A control object owns the tree of static HTML objects that it generates. Some or all of the objects in an object tree (e.g., Object tree 624 in FIG. 6B) can be created programatically or instantiated from a pre-defined template (e.g., template 608). For example, object tree 624 can be generated entirely at run-time. Alternatively, an initial definition of object tree 624 can be dynamically altered at runtime. Object tree 624 can be an object representation of a dynamic Web page. Alternatively, object tree 624 can be an object tree for a component of the Web page. The controller object owns its object tree.

The script 604, associations 606, and template 608 are used to generate all, or a portion of, a Web page. Script 604 contains some custom or scripted logic. Custom or scripted logic that is associated with a component and its control object can be implemented in any interpreted or compiled language. Script 604 is written in an objective C that is interpreted at runtime. However, script 604 can be written using any programming language (e.g., JAVA). Script 604 includes two sets of logic: "willSendWith" and "thanksUser". The "willSend- With" script is executed during Web page generation. It can be invoked by the logic associated with the previous page, for example. It contains a page-level persistence declaration for an employee object. In addition, it can contain logic to fetch an employee from the external data source and store the retrieved data in the employee object's properties (e.g., an employee name is retrieved and loaded into the "name" property of the employee object).

The "thanksUser" script is executed as an action taken once the Web page is returned by the client. It contains a local-level persistence declaration for "nextPage". It can also contain, for example, logic to determine the next page that should be generated and sent to the client as a response. In addition, the logic can create the new page object, request that the new page invoke its own logic, and return the identity of the next page to the application. The application can insert the identity of the next page in a response object (see a discussion of response object below in Event Processing).

A pre-defined template can be written using any Web page definitional language, syntax, or construct. For example, template 608 is written in HTML. Alternatively, a template can be written using JAVA, PDF, VRML, or ACROBAT, for example.

The particular syntax used to define an association file entry (i.e., an association). Association characteristics that are used in the preferred embodiment include: binding information, static element declarations, and property declarations. Property declarations can include instance variable initializations, for example.

Script 604, associations file 606, and template 608 are used to generate object graph 624 in FIG. 6B. A root object 642 is instantiated as the root of the object tree. Root object 642 can be, for example, a group object. FORM 644 is a group object instantiated from template 608 (i.e., the NSTAG statement having a NAME property equal to "FORM") and association 606 (i.e., the association having the "FORM" label or name). String object 646, form object 648, and EMPLOYEE object 650 are included in FORM 644. String 646 and form 648 are HTML static objects. EMPLOYEE object 650 is a group object that corresponds to the GROUP declarations in association 606 (i.e., the association having the "FORM.EMPLOYEE" label or name) and template 608 (i.e., the NSTAG statement having a NAME property equal to "EMPLOYEE").

Block 626 includes controller objects. The associations contained in the Associations file 606 and the statements in the template 608 include binding information for the controller objects. Control objects can be instantiated using the associations contained in association file 606. Further, the associations contained in the Associations file 606 can be used by control objects to determine what static HTML elements should be created.

The formControl object 662 is bound to FORM 644 via the FORM association in the associations file 606 and FORM group template of template 608. The formControl object 662 is instantiated from the object control subclass. It is used to manage a HTML static element. The formControl object 662 uses the information in the FORM association to instantiate a static element (e.g., NSWHForm static HTML element). Using the group identification ("FORM:") contained in the FORM association, the formControl object 662 instantiates form object 648 and inserts it in the object graph 624 inside the FORM group.

Associations can further be used to bind external data 630 to Web page 622 and its corresponding object graph 624, controllers 626, and context 628. The inputControl 664 is instantiated from the "FORM.EMPLOYEE" association. It instantiates text object 654 and inserts it into the EMPLOYEE group 650. The "FORM.EMPLOYEE" association contains a "value" property that is equated to "employee.name". The "value" property identifies the object that contains the external data retrieved from external data source 630.

Figure 10:
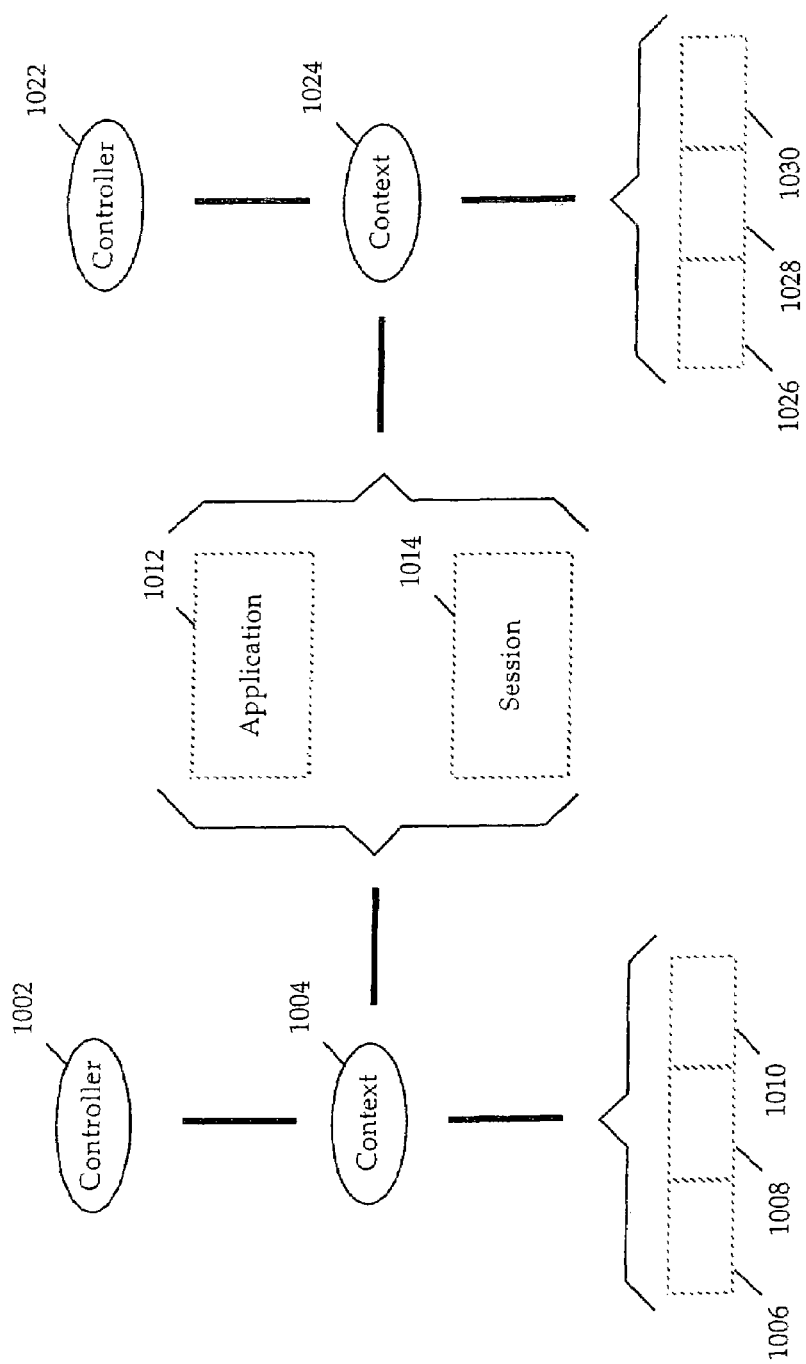
FIG. 10 illustrates context objects.

Each control object instance has an associated context. Associated enterprise objects are found within a scriptedControl's context. Preferably, each scriptedcontroller has its own context object (i.e., an object that manages object pools). FIG. 10 provides examples of context objects. Controllers 1002 and 1022 are running in the same session and application. Controller 1002 has context object 1004. Controller 1022 has context object 1024.

Context object 1004 manages object pools 1006, 1008, and 1010. Object pools 1006, 1008, and 1010 are unique to controller 1002. Examples of object pools 1006, 1008, and 1010 are transaction, page and local object pools. Similarly, context object 1024 manages object pools 1026, 1028, and 1030 for its associated control object 1022.

Object pools 1012 and 1014 are shared by controllers 1002 and 1020. Examples of object pools 1012 and 1014 are application and session pools, respectively. Therefore, context objects 1004 and 1024 share in the management of object pools 1012 and 1014.

Referring to FIG. 6B, if employee object 672 does not already exist, the inputControl object 664 creates it in context 628 using its context object. Employee object 672 includes a "name" property. Script 604 contains a declaration for employee object 672 (i.e., "page employee;") that indicates that employee object 672 has page-level persistence.

Push and Pull Modes

Controller objects provide the ability to dynamically alter a page. For example, a controller can insert a static element into the template. The type and attributes of the static elements created by the controller objects are a function of the control class. For example, an imageControl object instance generates an image HTML element. Further, a controller can modify the properties that are used to generate the page. In both cases, the controller causes the resulting Web page to be dynamically generated or altered at runtime.

In the present invention, corporate data can be accessed and used to generate a Web page. Data is retrieved from an external source (e.g., database) and inserted into a Web page. Input data returned via a Web page can be used to update the external data. A control object instance can be used to interface with the external data. A controller causes data retrieved from the external data source to be stored in the context. Data returned via a Web page is retrieved from the page and stored in a context.

Figure 11A:
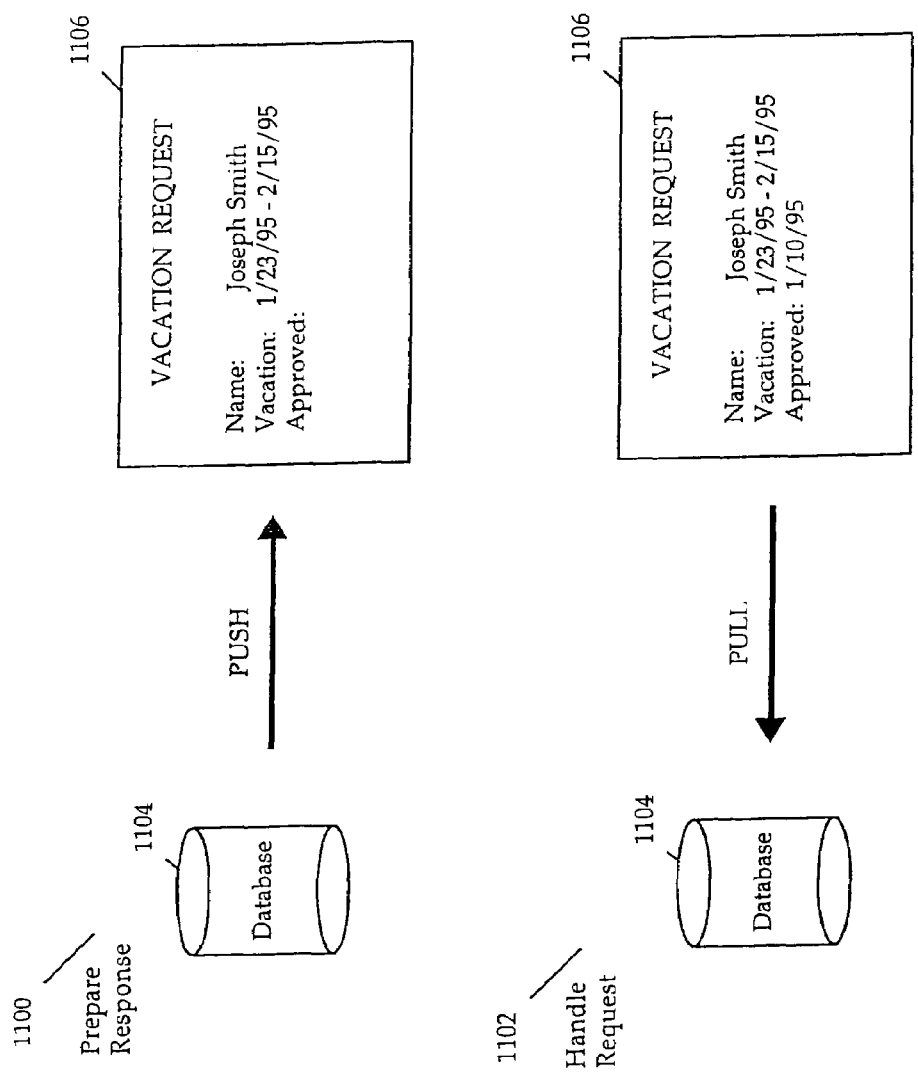
FIGS. 11A-11B illustrate the push and pull modes of the present invention.

FIG. 11A provides an example of the push and pull modes used in the present invention. When a response is prepared, information (e.g., data or logic) is retrieved from an external data source (e.g., database 1104) and pushed into a Web page 1106. This is referred to as push mode. When a request is being processed, information is pulled from a Web page 1106 and stored in the external data source 1104. This is referred to as pull mode.

Figure 11B:
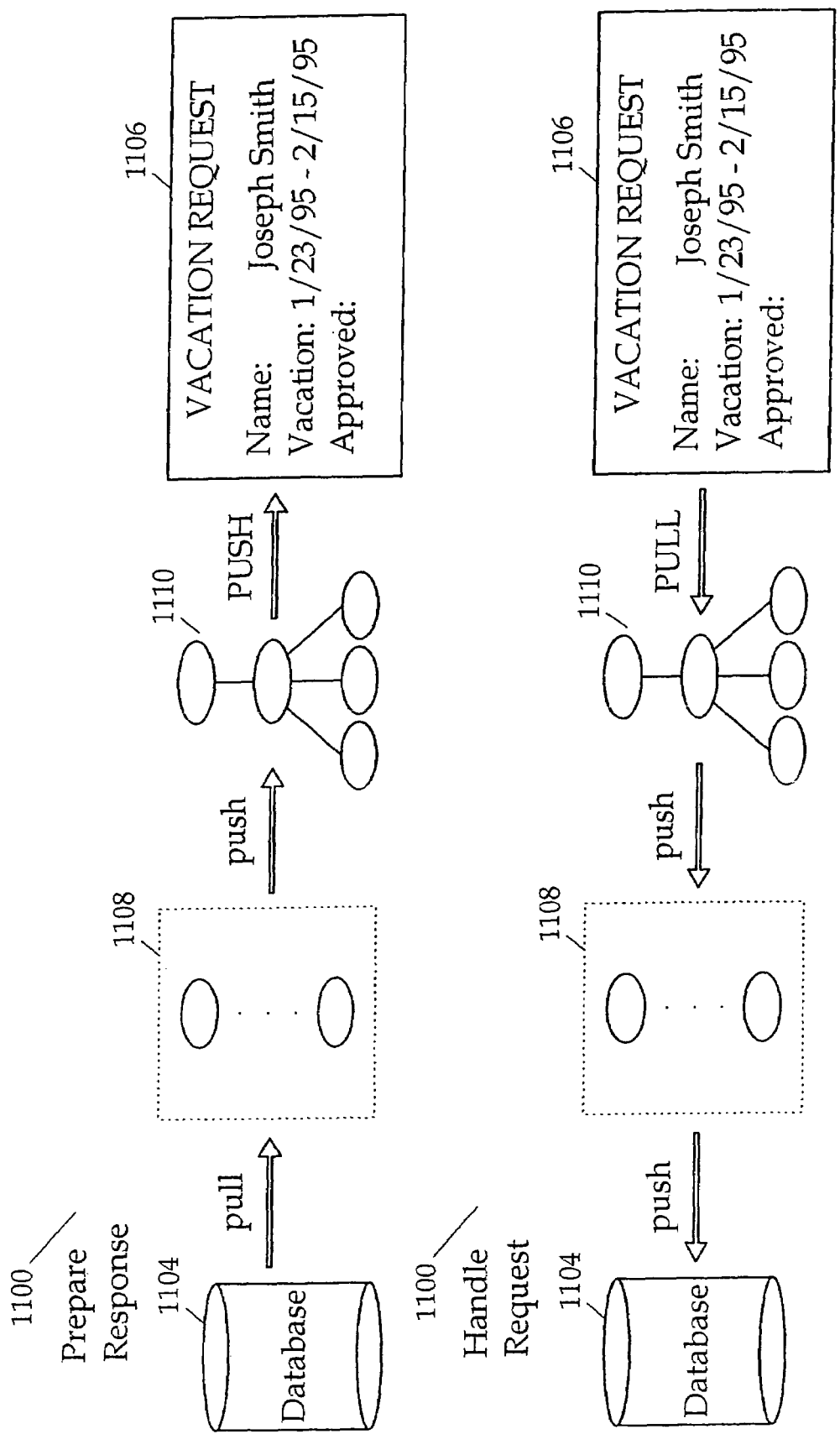

In the preferred embodiment, objects act as intermediaries between the Web page 1106 and the external data source 1104. FIG. 11B provides examples of intermediary objects.

In the push mode 1100, information is pulled from the external data source 1104 into context objects 1108. Information contained in context objects 1108 is used to update Web page definitional objects in object tree 1110. When the Web page description (e.g., HTML) is generated using the objects in object tree 1110, the data retrieved from external data source 1104 is pushed into the Web page 1106. Therefore, in push mode, information is pulled from a data source and pushed into the Web page.

In pull mode, information is pulled from a Web page and pushed into storage. Referring to mode 1102, information is pulled from Web page 1106. For example, key-value pairs of objects in object tree 1110 contain the data pulled from Web page 1106. Information in the key-value pairs is pushed into the context objects 1108. Information contained in context objects 1108 is pushed into the data source 1104.

Preferably, an interface such as NeXT's Enterprise Objects Framework is used to interface with an external database source. Use of enterprise objects as an interface with a database is more fully described in U.S. patent applications entitled Method of Mapping Objects to Multiple Tables in a Relational Database (Ser. No. 08/353,522), Method for Providing Stand-in Objects (Ser. No. 08/353,523), Dynamic Object Communication Protocol (Ser. No. 08/353,524), and Method for Associating Data Containing Objects With User Interface Objects (Ser. No. 08/353,525), filed on Dec. 7, 1994, assigned to the assignee of the present invention and incorporated herein by reference.

In the preferred embodiment, controllers are used to manage the push and pull modes. For example, a controller manages the pushing of data from an external source into a Web page. A controller manages the process of pulling information from a Web page. Data pulled from a Web page can be used to update an external source.

The inputControl 664 is an example of a controller that pushes and pulls data. The inputControl 664 has an instance variable (ivar) called value that is, for example, a variable object that points to employee object 672. The variable object knows that it points to the "name" property of employee object 672. The inputControl 644 can ask the variable object to set value in and get value from the "name" property of employee object 672. Therefore, the variable object can be used as an intermediary between inputControl 644 and the corresponding corporate object, employee 672. Alternatively, inputControl 644 could associate with employee object 672 using a pointer to employee object 672.

In the push mode, a control object is responding to a "prepareResponse" message. In push mode, data is retrieved from the external data source and used to dynamically generate all or some portion of a page or component. The control object loads its associated script(s), association(s), and template(s). The control object manages the retrieval of data from the external data source and the modifications made to the object tree owned by the control object.

For example, inputControl 664 determines based on the "FORM.EMPLOYEE" association in associations 606 that a text HTML static element should be included in object tree 624. It first looks at the object tree 624 to see if the text object 654 exists. If it does not exist, inputControl 664 creates text object 654 and inserts it into the o,e tree 624. The inputControl object 664 sets the properties for text object 654 using the attributes or properties contained in the associations file 606. The text object 654 includes a "value" property that can be used to initialize the input field 632. The inputControl 664 uses the data contained in the "name" property of employee object 628 to set the "value" property of text object 654.

In pull mode, a control object receives a "handleRequest" message. In pull mode, data is pulled from the Web page and can be pushed back to the external data source. The control object responds to the message by loading its associated script(s) and association(s). The control object can also respond to the message by taking data retrieved from a form returned by the client and storing it in a context object. Data stored in a context object can be used to update the external data source.

For example, inputControl 664 examines the request information to determine whether it contains a reference to it (e.g., name of the inputControl 664 in the request arguments). If it finds a reference, it will execute the appropriate behavior. For example, the client may have modified field 632 to specify a new name. The inputcontrol object 664 takes the value that is returned in the form and places it in the "name" property of employee object 672. At that point, a data source object can be used, for example to update the database. There can be, for example, a method in the page object that sends a message to the data source object to update the database.

The movement of data in the push and pull modes is illustrated in FIG. 6B using pathways 612, 614, 616, and 618. It should be understood that these are used for illustration purposes only. The pathway including 612, 614, and 616 provide one example of the movement of data from an external data source 630 to the Web page in push mode. For example, path 612 includes a data source object that can be used to fetch data from and store data in external data source 630. Similarly, path 618 provides one example of the movement of data from the Web page to the external data source 630 in pull mode. A change to the name value field 632 in Web page 622 can be stored text object 654 and then moved to external data source 630 directly or via employee object 628.

Data source 630 can be, for example, an enterprise's corporate database. Alternatively, data source 630 can be a electronic mail system or online services retrieval system, for example.

Repetition Control

The repetition control is a subclass of the control class. It is used to generate a repeating subcomponent of the Web page. A repeating subcomponent is a portion or block within the Web page that repeats (e.g., each half of Web page 334 in FIG. 3B). To display each repetition at a client site, a block of HTML statements must be generated for each repetition. A repetition control object contains behavior that replicates the HTML that defines each repetition.

A repetition control object, or repetition controller, in conjunction with other logic and data is used to modify the object tree to accommodate the repeating subcomponent(s). For example, the HTML template in Table Four contains an ordered list HTML element. The content of the ordered list is not specified in the HTML template. In the preferred embodiment, the repetition controller creates a template to generate the contents of the ordered list. A repetition control object enumerates on an array to duplicate the template for each iteration. These objects generate a list of employees when the Web page document is generated.

Figure 7B:
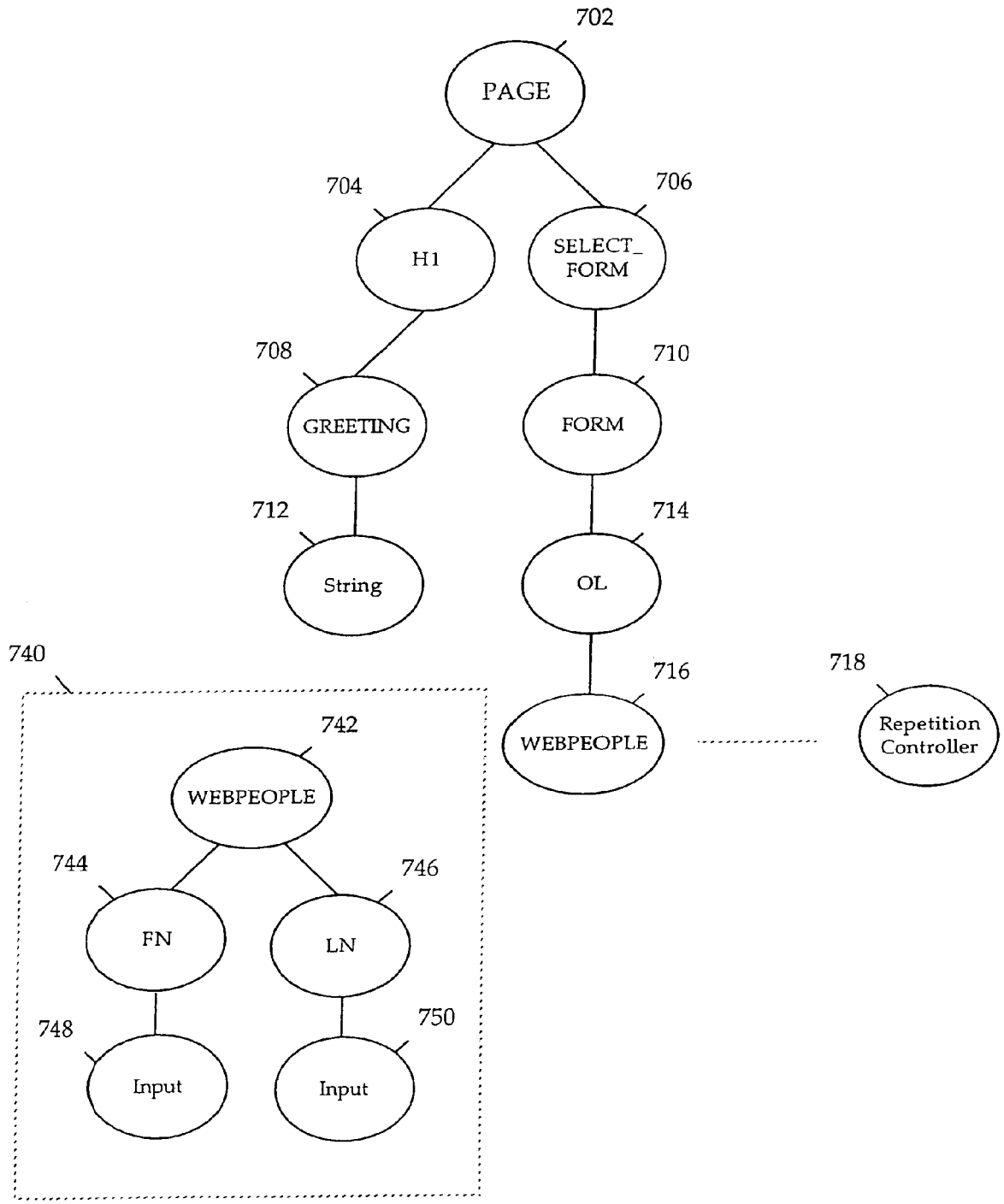
FIG. 7B provides an example of the object tree of FIG. 7A and an associated repetition controller and repetition template.

FIG. 7B provides the object tree of FIG. 7A and an associated repetition controller and template. The association linked to the "GREETING" group specifies that an "NSWString" control object is to be instantiated. "NSWHString" object 712 is instantiated by the "NSWString" control object and inserted into the object tree as a child of the group whose name is contained in the name field of the association having the "NSWString" declaration. In the object tree, "NSWHString" object 712 is inserted under the "GREETING" group object 708. The "NSWHString" object class provides cover for free-floating text. The property field in the association is used to assign a value to the "value" property of "NSWHString" object 712. The "value" property of "NSWHString" object 712 contains the text string used to generate the HTML document.

The "WEBPEOPLE" group object 716 has a corresponding association. The association contains an "NSWRepetiton" control class reference. Based on this, an instance of the "NSWRepetition" control class is instantiated and is associated with "WEBPEOPLE" group object 716. The "NSWRepetition" controller 718 provides behavior to generate repeating subcomponents of the Web page.

The "list" property field in the "WEBPEOPLE" association specifies a container object, "employees". The "employees" container object contains an array of objects that is used to populate the ordered list specified in the HTML template in Table Four. The repetition controller 718 enumerates on the "employees" container object. The "item" property field specifies a variable object that is used to update the context with specific employee information.

Template 740 is used as a template to generate repetition occurrences. Template 740 includes the "FN" group object 720 and "LN" group object 722. "WEBPEOPLE" group object 742 is used to insert a repetition occurrence into the object tree under "WEBPEOPLE" group object 716. "FN" group object 720 and "LN" group object 746 includes NSWHInput objects 744 and 746, respectively.

The context of the application is used to store data that is used to modify the HTML objects contained in the duplicated template (e.g., input object 724). The context is the name space of the application. Preferably, the context provides a data dictionary that contains the name of an object and a pointer to the object. When the "item" property is encountered in an association, an "NSWVariable" object is created and points to an "employee" object. Repetition controller 718 iterates on the items in the "employees" object array. Repetition controller 718 sends a "get_value" message to the employee name-value object. The variable object updates the context in response to the message.

When a "get_value" message is received by the "employee" object, it retrieves the next value of the array and stores it in its properties in the context. For example, the "employee" object can gets a first name and a last name of an employee from the "employees" array.

The "employee" object has behavior to respond to "set_value" message. The key-value pairs of a definitional object (e.g., HTML object) contains data that is retrieved and used to set a value in the "employee" object in response to a "set_value" message. When the "set_value" message is received by the "employee" object, it sets the context.

For each iteration, the repetition controller 718 duplicates template 740 (i.e., "FN" object 744, "LN" object 746, NSWHInput object 748, and NSWHInput object 750). The repetition controller 718 activates the declared objects in the duplicated template. Repetition controller 718 passes the HTML template and the information received in the client request (if any) to the declared objects.

When the "FN" group object 720 is activated, it modifies the objects contained in its group (i.e., NSWHInput object 724). The value property of NSWHInput object 724 is modified using the "fn" property of the "employee" object (i.e., an employee's first name). The value property of NSWHInput object 726 is modified with the "ln" property of the "employee" object (i.e., an employee's last name). One iteration of the "employees" array is completed.

In the next iteration, the next index in the "employees" array is used. Repetition controller 718 duplicates the template, and modifies the objects in the duplicated template. The value property of NSWHInput duplicated object is modified using the new first name value (i.e., the value from the next object in the "employees" array) in the "fn" property of the "employee" object. The value property of NSWHInput duplicated object is modified with the new last name value in the "ln" property of the "employee" object. A second iteration of the "employees" array is completed. This process is repeated for each iteration of the array.

Figure 7C:
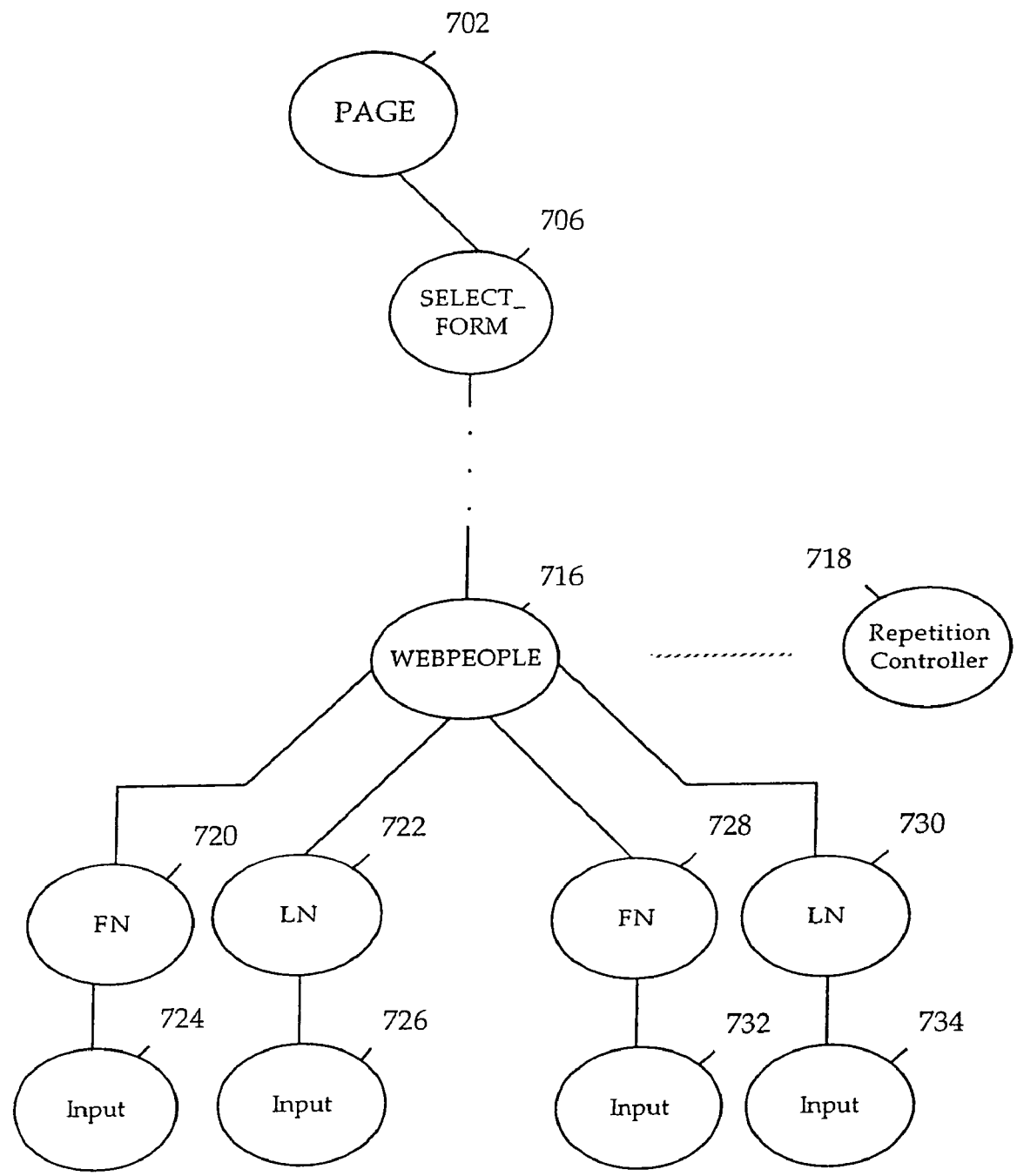
FIG. 7C provides an example of the object tree of FIG. 7B that has been modified using a repetition controller and template.

The repetition controller 718 inserts the trees for each repetition occurrence into the object tree. Repetition controller 718 uses the corresponding group designations to determine the location at which a template duplication is inserted into the tree. Referring to FIG. 7C, repetition controller 718 adds "FN", "LN" NSWHInput and NSWHInput objects 720, 722, 724, 726, respectively, under "WEBPEOPLE" group object 716. Similarly, "FN" "LN" objects 728 and 730, and NSWHInput objects 732 and 734 are inserted into the tree under the "WEBPEOPLE" group object 716.

In summary, according to the preferred embodiment, a repetition control generates a template either from scratch or using resources (e.g., HTML template, associations, etc.). The template is duplicated for each iteration or repetition occurrence. For each iteration, the repetition controller: 1) duplicates the template; 2) modifies the duplicated template; and 3) inserts the modified template into the object tree. Using this technique, it is only necessary to parse the definition to generate a template. The template can be used to generate each repetition.

Alternatively, the definition is parsed at the beginning of each iteration. The template is then modified to generate a particular occurrence of an iteration.

Subcontrols

A scriptedControl object can have subcontrols. A subcontrol can be another scriptedControl object. For example, a component has an associated scriptedControl object that is a subcontrol of the page's scriptedControl object. A subcontrol can be an object control such as imageControl, stringControl, or inputControl. Subcontrols can be created programmatically or instantiated from a pre-defined declaration.

Figure 6C:
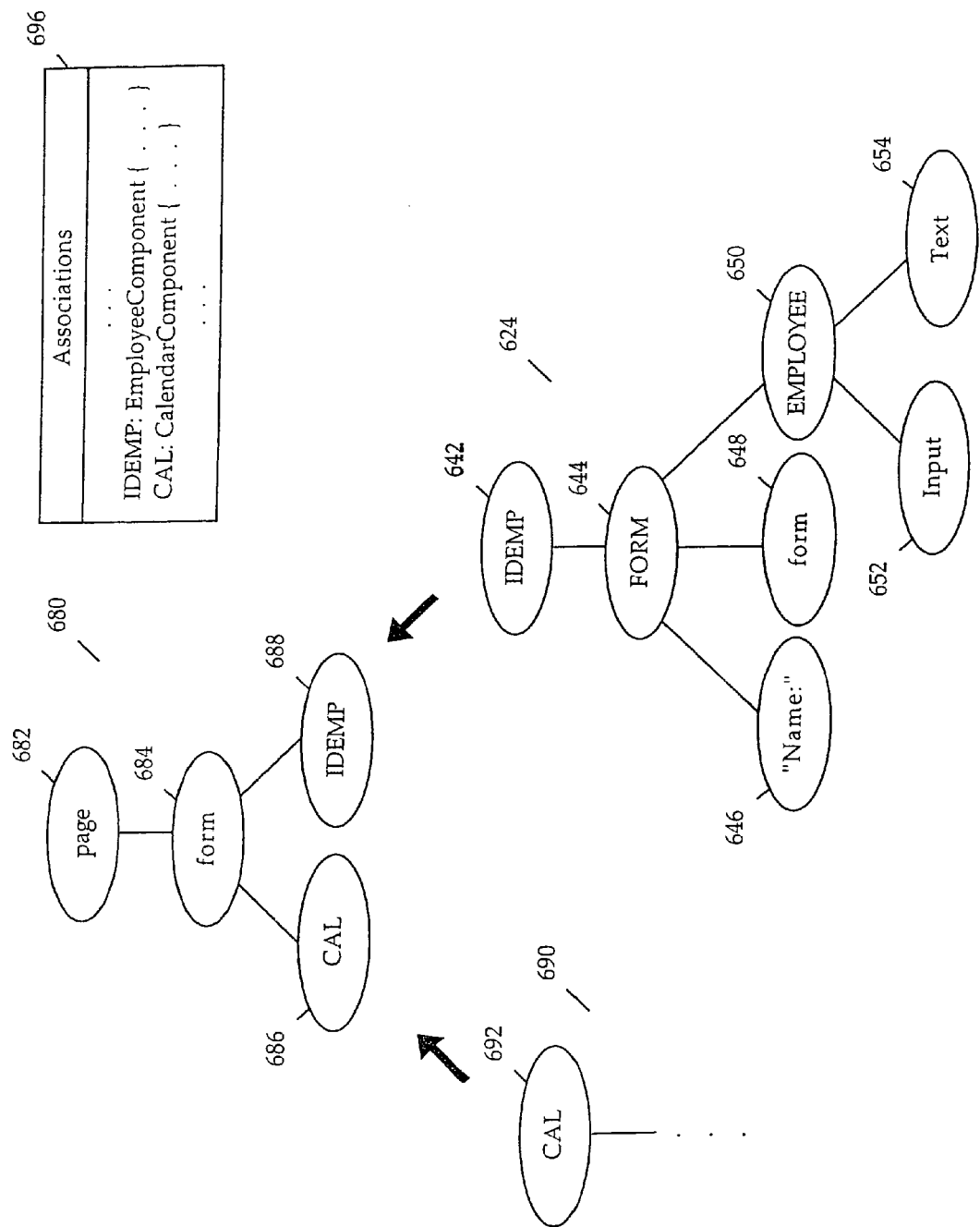
FIG. 6C provides examples of a parent tree and two component or sub-trees.

A subcontrol binds with a group element in the object tree of the subcontrol's parent control. FIG. 6C provides examples of a parent tree and two component or sub-trees. Parent tree 682 contains static HTML element 684. In addition, parent tree 682 contains two group elements (CAL group element 686 and IDEMP group element 688). The parent control is a scripted control that has an associations file 696.

Associations file 696 contains an IDEMP association. Using the IDEMP association, an IDEMP group element 688 is instantiated and inserted into the parent's tree 680. CAL group element 686 is instantiated and inserted in tree 680 based on the CAL association in associations file 696. Associations file 696 identifies that CAL and IDEMP are subcontrols of the page scriptedControl.

Object tree 624 in FIG. 6B has been modified such that the root object 642 is an IDEMP group element. Association file 606 in FIG. 6A is modified to include an IDEMP association. Similarly, object tree 690 has as its root object a CAL group element 692 based on its corresponding association file.

The IDEMP and CAL group elements in object tree 680 are place holders. They correspond to the tag values used in association file 696. They further correspond to the tags used in the associations files for the CAL and IDEMP components. The parent's tags are matched with the subcontrol's tags to determine the locations at which the CAL and IDEMP component trees are to be inserted into object tree 680.

Like the control class, a subcontrol generates one or more static elements. The type and attributes of the static elements created by a subcontrol are a function of the subcontrol class and the template that is passed to the subcontrol (e.g., passed as a group).

A subcontrol is an instance of a class derived from the root control class. Therefore, a subcontrol can have associative behavior that allows it to perform push and pull operations as described above. The associative behavior of a subcontrol vests in the scriptedControl as well. That is, a scriptedControl for a page can be associated with an enterprise object because one of its subcontrols is associated to that enterprise object.

The associative behavior described above can be extended to include subcontrols. For example, in push mode a control object can load its script(s), associations) and template(s) and invoke its behavior. In addition, the control object transmits the "prepareResponse" message to its subcontrols. In pull mode, a control object forwards the "handlerequest" message to its subcontrol(s) in addition to performing the operations discussed above (i.e., load script, load associations, and invoke its behavior). Each subcontrol performs similar operations in response to the message that it receives.

Event Processing

A client uses a Web browser as a graphical interface to the Internet. The client can send a request (e.g., retrieve an HTML page) to an HTTP server using a Web browser. In response to a request, the client expects to receive something (e.g., a response) from the HTTP server. To respond to the request, the request is received and processed and a response is generated.

Figure 9A:
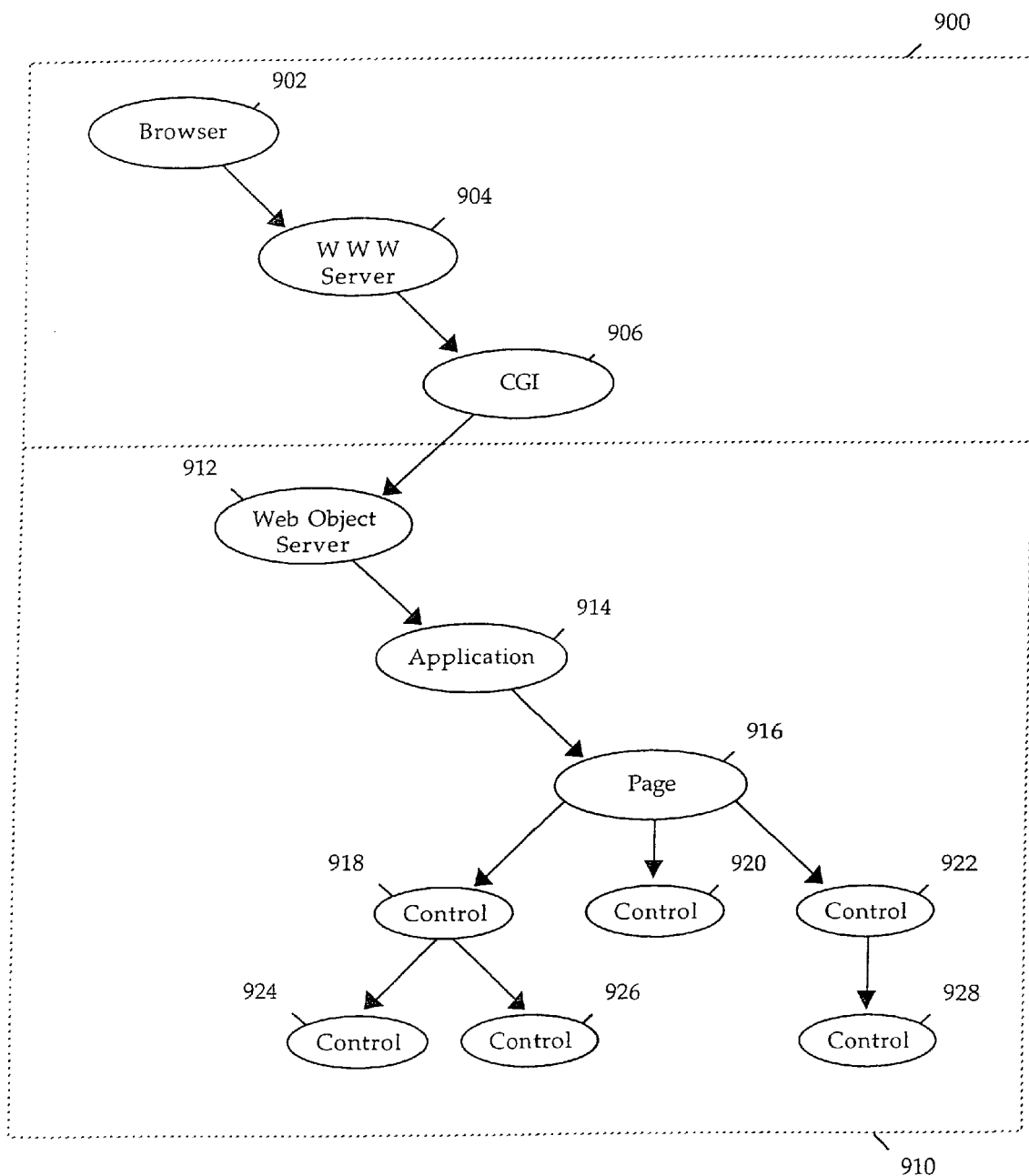
FIGS. 9A-9B illustrate event handling object diagrams.

FIG. 9A provides a block overview of components that can be used to handle a request. Browser 902 transmits a request to the WWW Server 904 (e.g., an HTTP server). WWW Server 904 transmits the request to CGI server 906. CGI server 906 identifies the Web Object server 912 based on the information contained in the request, for example. Request information is transmitted from CGI server 906 to Web Object server 912. Web Object 912 passes the request information to application 914. A page 916 manages the generation of a response. Controllers 918 928 are used, for example, to generate the response.

The components illustrated in FIG. 9A are used in the preferred embodiment of the present invention to process a request. It should be noted, however, that the transaction handling described herein can be performed with additional or fewer components. For example, CGI server 906 can transmit a request directly to application 914. Event objects are used in the preferred embodiment to process a request. Event objects are, for example, page, application, session, request, and response objects.

A page object represents an HTTP response (e.g., an HTML page). A response is generated by a page object. A page object can be dynamic. Its representation can change. The representation can vary, for example, based on the state of the data to which the page object refers.

An application object manages page objects. The pages managed by a application object typically are related and can be combined to allow a client to accomplish a specific goal. For example, one page may need data that was entered in a previous, related page. Or, for example, a page may lead to another page. Pages can refer to the same data, for example.

A transaction is started by a client action. It ends when a response is received by a client. A request is the client action that initiates a transaction, for example. An HTML representation of a page is one example of a response that ends the transaction, for example. A transaction uses a request object and a response object. The request and response objects act as a vehicle for passing information (e.g., invocation and response information). For example, request and response objects can be used to pass information between control objects. The application queries the information contained in the response and request object during event processing.

A response object is associated with a transaction. A response object retains information that is used to respond to the client. When a response is identified (e.g., next page to send to the client), the application builds a response object. The application sends a "prepareResponse" message to the response page and passes the information associated with the response to the response page. The response page manages the generation of the response.

A request object represents a user action that needs to be processed. The request object includes, for example, information regarding the application object (i.e., to handle the request), page object(s), and specific areas of a page that are selected or activated by the client. If a form is submitted by the client, the request includes data entered in the form, for example. The request can further contain state information including information regarding the pages previously traversed by the client and the data entered in these pages, for example.

A request preferably includes the following information: application name, pathname for desired page, session identification, transaction identification, sender identification, a digital signature, and form data. This information can be stored in the request object's properties. The application name identifies the application that handles the request. The pathname specifies the path, or location, for the page in which the client took an action that initiated a request. Where the action is independent of a page (e.g., login panel), the pathname identifies the location of the page solicited by the client.

The session identification (ID) identifies the client's session. A transaction identification (ID) specifies the last transaction completed for the client for an existing session. A sender identification (ID) identifies the portion of a page that was acted upon to initiate the request. For example, when a request is initiated when the client clicks on an anchor in an HTML page, the Sender ID identifies the name of the anchor object in the corresponding page. A digital signature can be used as a key to perform verification. For example, the digital signature can be used to verify that a request is a valid request generated by a valid client. The digital signature can further be used to verify that the client is authorized to access the data of the specified session.

Form data is preferably a set of key-value pairs (e.g., each pair including a key and a value associated with the key). When a page submission generated the request, the key-value pairs contain client-entered data from the page that generated the request.

A session object represents a series of transactions. A session object exists for each transaction. Transactions that are related are preferably represented by the same session object. Transactions may be related in that they are handled by the same application, for example. When transactions are handled by the same application, an application can be said to manage a set of sessions, each of which manages a subset of the related transactions.

Figure 9B:
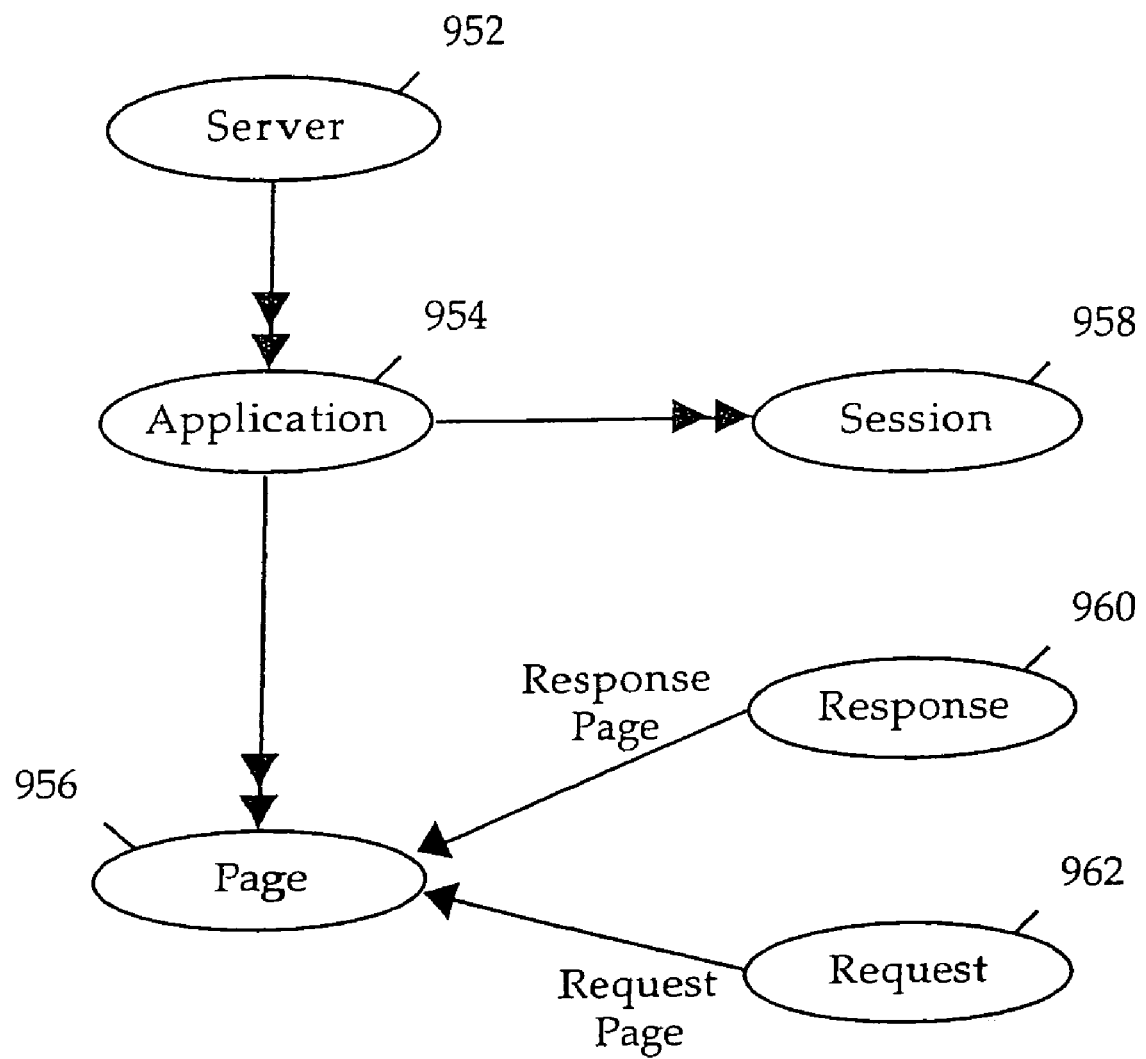

FIG. 9B provides an illustration of the relationships that can exist between the event objects. Server 952 owns one or more applications such as application 954. Application 954 owns one or more pages such as page 956 and a set of sessions such as session 958. Response object 960 is aware of an instance of page object 956 (i.e., a response page). Request object is aware of an instance of page object 960 (i.e., a request page).

Figure 5A:
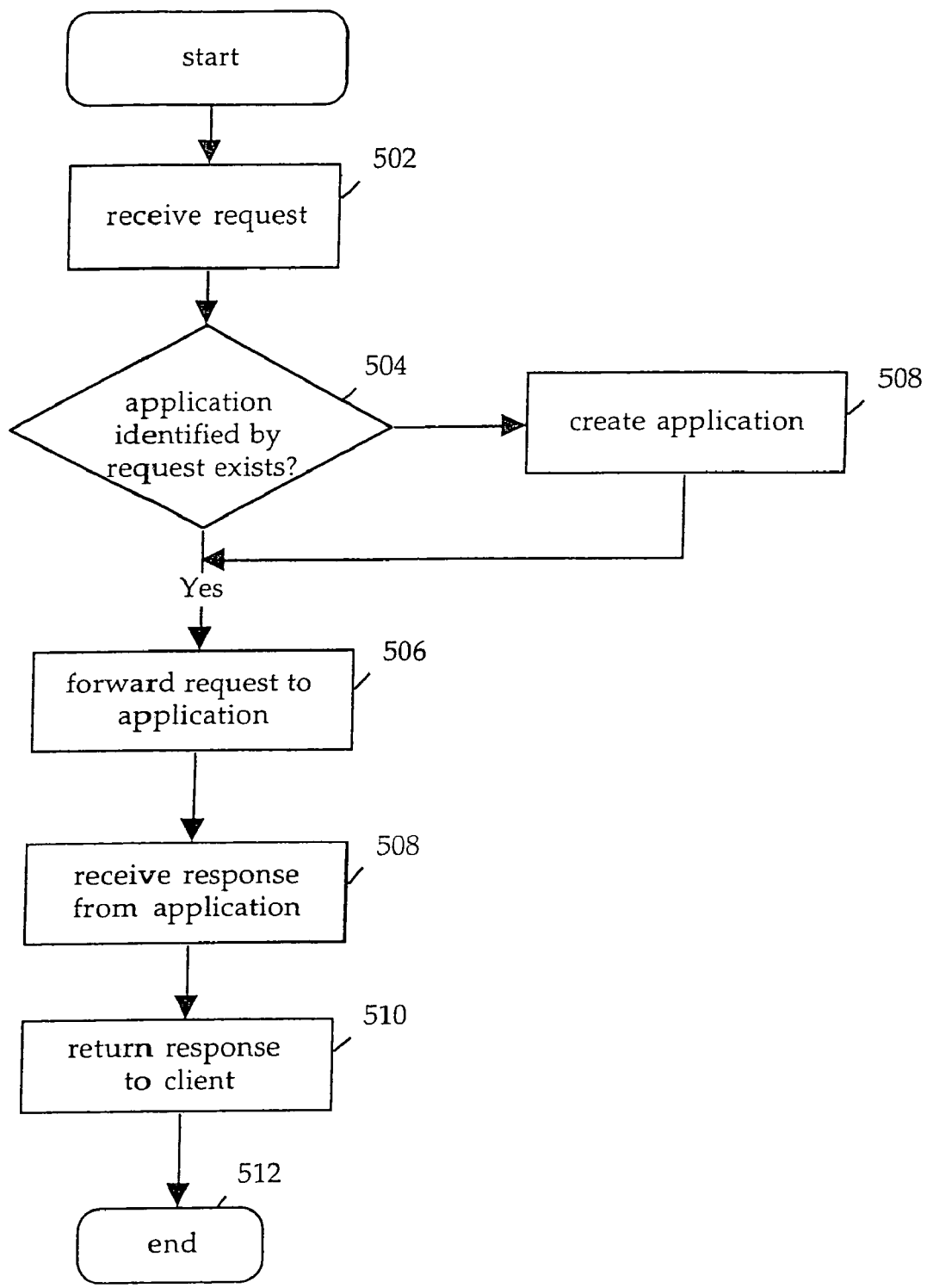
FIGS. 5A-5E provides an example of a process flow for handling a client request.

As described above, a request is transmitted to the Web Objects server from the CGI server. FIG. 5A provides an example of a process flow executed by the Web Objects server to manage applications. A function of the Web Objects server is to dispatch a request to an application that processes the request.

At step 502, the request is received by the Web Objects server. Using the information contained in the request, the Web Objects server identifies the application that will process the request. At step 504, the Web Objects server determines whether the application is executing either on the same or a different server, for example. If the application is not currently loaded, the Web Objects server initiates the application at step 508 and processing continues at step 506. If the application is executing, processing continues to step 506.

At step 506, the request is forwarded to the application. The Web Objects server receives a response from the application at step 508. At step 510, the response is forwarded to the client. The response is forwarded to the client via the CGI server 906, the WWW Server 904, for example. Processing ends at step 512. Web Objects server is available to process each request that it receives in a manner such as described in FIG. 5A.

An application processes a request that it receives from a Web Objects server. When a client request is received by the application, the application manages the update and retrieval of data from the context, processes the received form (i.e., the form received from the client that includes the client request), and processes any return form (i.e., a form sent to the client in response to the client request).

Figure 5B:
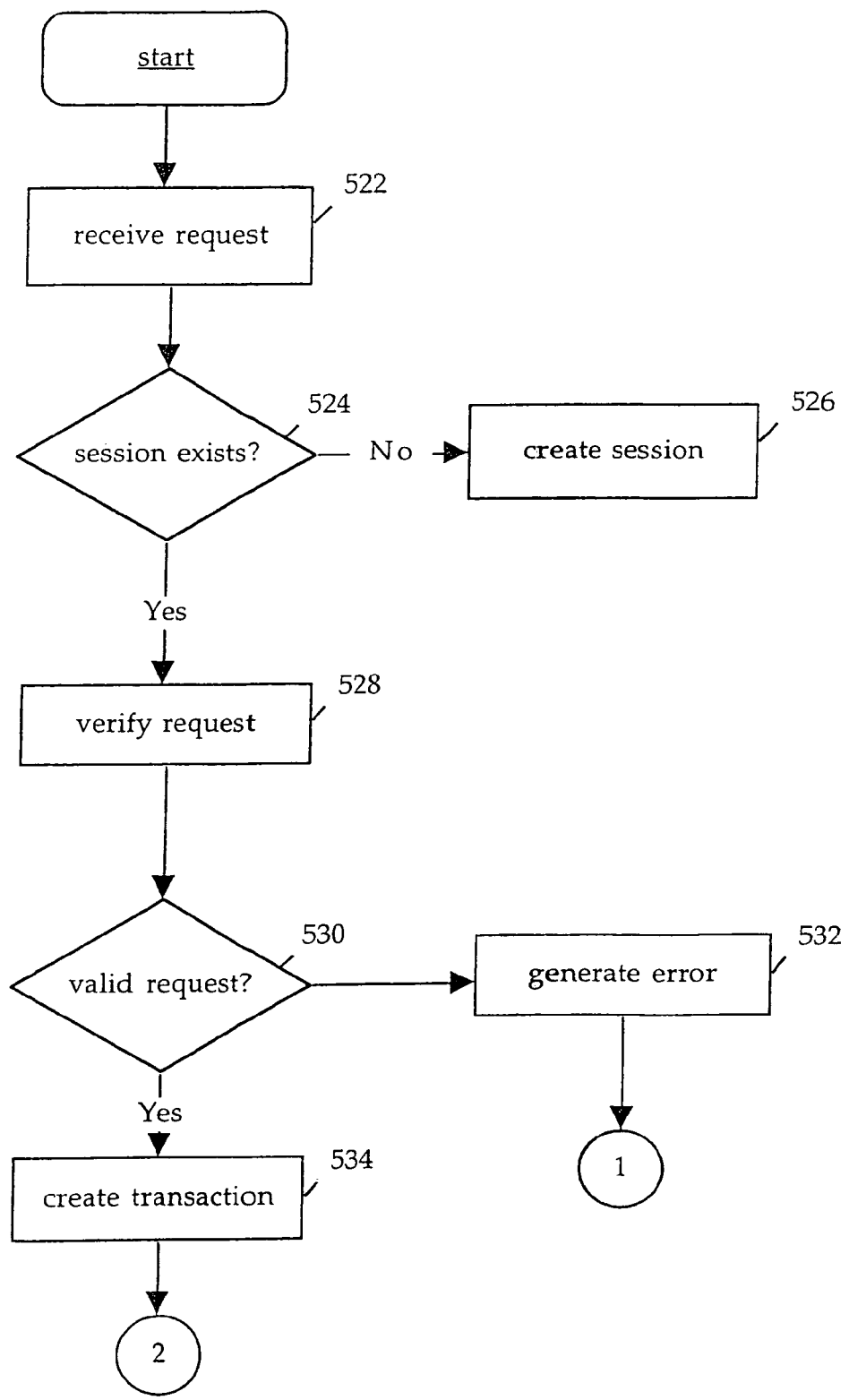
Figure 5C:
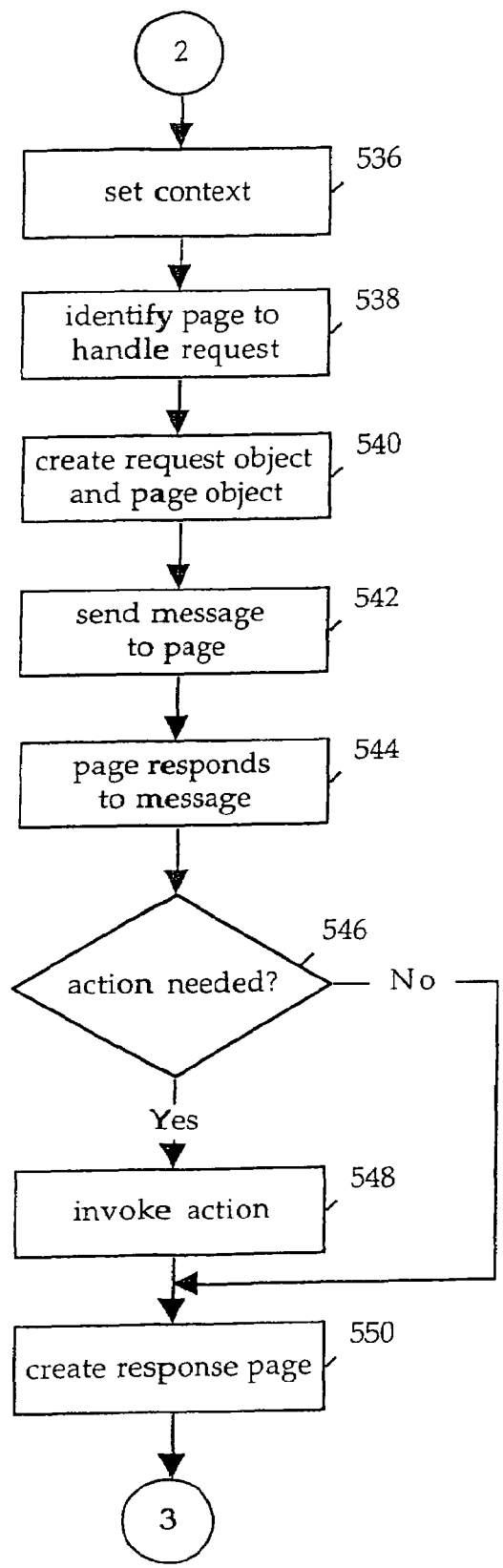
Figure 5D:
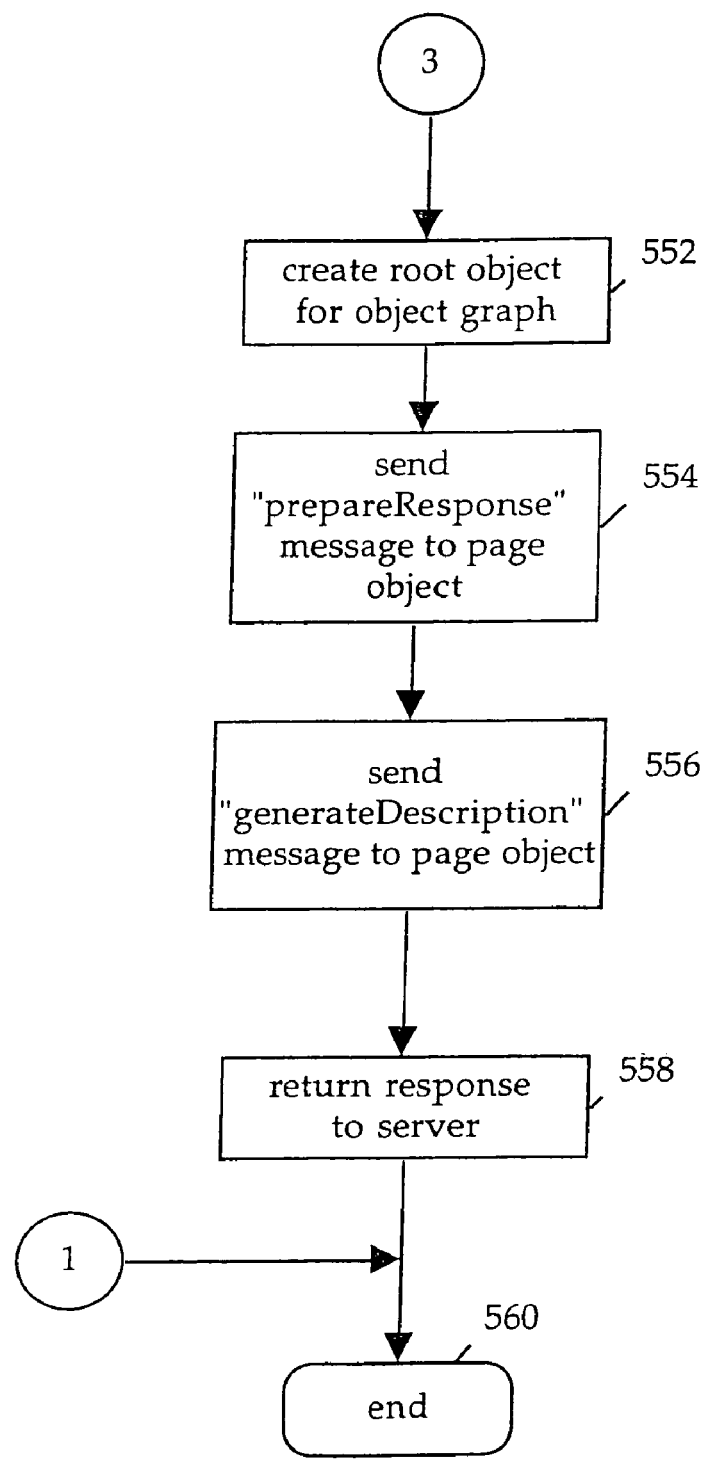

FIGS. 5B-5D provides an Application Request Handling process flow. At step 522, a request is received by the application. At step 524, the application determines whether the request involves an existing session. For example, the application examines the contents of the session ID, transaction ID, sender ID and signature properties in the request object. If values for these properties are missing, the application proceeds to create a session to process the request at step 526. Processing continues at step 534.

Figure 5E:
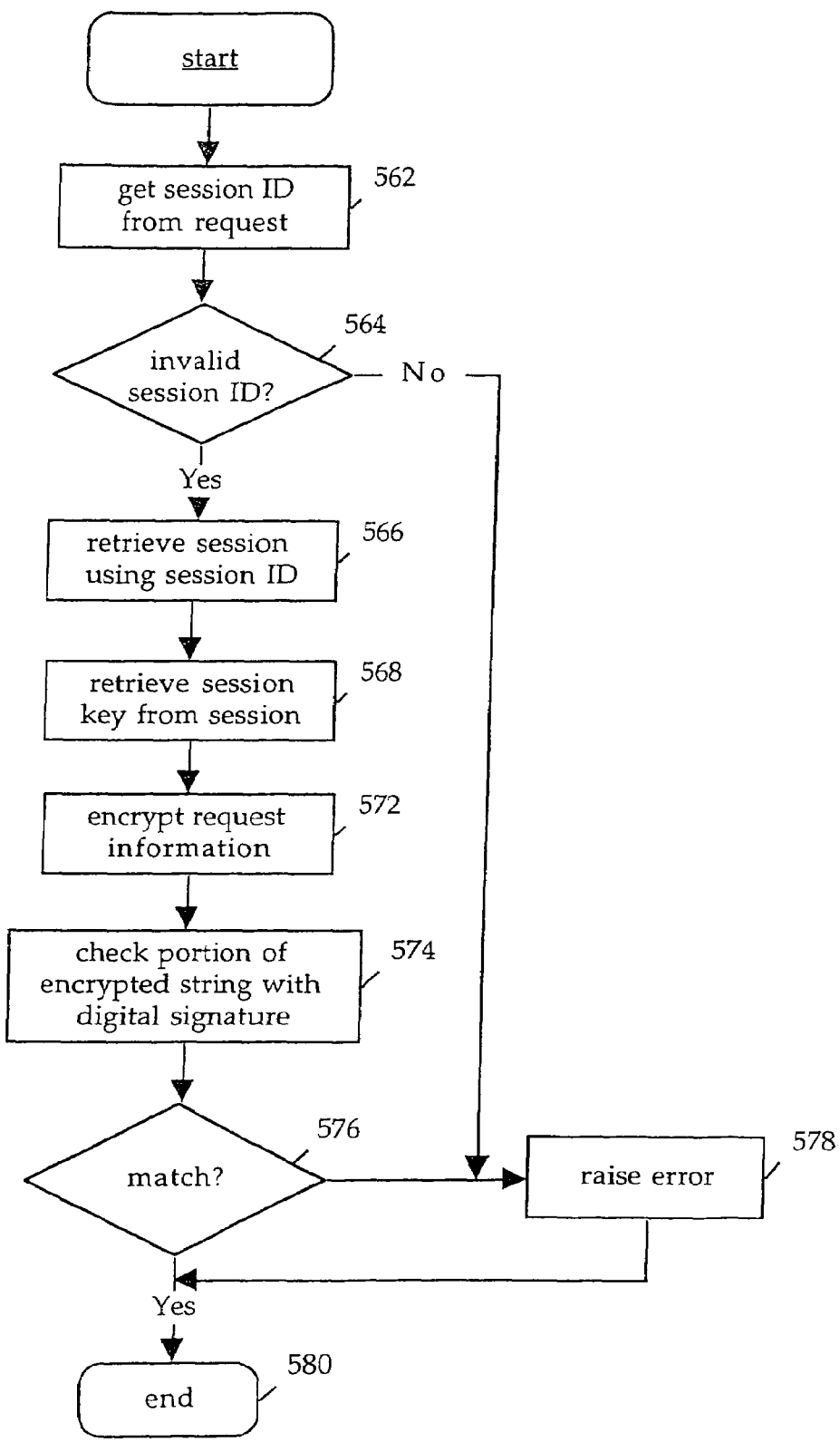

If there are values for these properties, processing continues at step 528 to verify the request that requests access to an existing session. FIG. 5E provides a Verify Request process flow. At step 562, the application retrieves the session ID from the request information. At step 564, the application determines whether the session ID is a valid session ID. That is, for example, the application determines whether the session contained in the request corresponds to a session ID for a session that is managed by the application. If the session ID is not a valid session ID, an error is raised at step 578 and processing returns to the Application Request Handling process (i.e., step 526 in FIG. 5B).

If the application determines that the request's session ID is a valid session ID, processing continues at step 566. At step 566, the application retrieves the session using the session ID. At step 568, the application retrieves a session key from the session. A session key is generated when a session is created. The session retains this value. The key is accessible by the session and the application that manages the session. To retrieve the session key, the application retrieves the session from the set of session that it 1o manages. At step 572, the application encrypts a string that contains request information (e.g., page path, session ID, previous transaction ID, and sender ID) is encrypted using an encryption algorithm. Any encryption algorithm can be used. Preferably, however, an encryption technique such as described in U.S. Pat. Nos. 5,159,632 and 5,271,061, entitled Method and Apparatus for Public Key Exchange in a Cryptographic System, assigned to the assignee of the present invention, and incorporated herein by reference. The Data Encryption Standard implemented in Unix can also be used with the present invention. It is preferable that the encryption scheme used:

1. does not deduce an input string from an output string;
2. does not deduce an encryption key from the input string and/or the output string; and
3. generates a large and unpredictable change in the output string when a small change (e.g., one character) occurs in the input string.

At step 574, a portion of the encrypted string is examined against the request's digital signature. At step 576, the application determines whether the encrypted string and the digital signature match. If a match does not exist, processing continues at step 578 to raise an error. Whether or not a match exists, processing returns to the Application Request Handling process (i.e., step 526 in FIG. 5B).

When the encryption scheme described in U.S. Pat. Nos. 5,159,632 and 5,271,061 or Unix's Data Encryption standard is used, a match indicates that:

1. the digital signature was generated with knowledge of the session key; and
2. the page path, session ID, previous transaction ID, and sender ID values contained in the request were used to generate the digital signature.

Since the session key is known only to the application and the session, a match between the encrypted string and the digital signature indicates that the request's information and the digital string were generated in a previous transaction of the session.

At step 524, the application verifies that the request is a valid request. The application can use the information contained in the request object to verify the request, for example. The digital signature property contains information that identifies a session, transaction, sender, for example. If this is a new request, the digital signature does not contain a session ID or transaction ID.

After verifying the request (as described in FIG. 5E, for example), the application continues to process the request as described in FIG. 5B. At step 526, the application determines whether the verification process identified a valid request. If it was not a valid request, processing continues at step 532 to raise an error and processing ends at step 556 of FIG. 5D. The error condition can be transmitted back through the chain illustrated in FIG. 9A and communicated to the client, for example.

Referring FIG. 5B, the application has determined that the request is valid as well as the request's session. The application creates a transaction at step 534. Initially, the transaction contains a reference to the request that resulted in its creation. The transaction tracks the state of the request handling.

Referring to FIG. 5C, the application establishes context information for the transaction in step 536. Context information includes the data that is created or modified during processing. Context information can include, for example, data created or modified by other transactions that exist in the same or different sessions. Preferably, the context is stored in objects that can be accessed by the transaction during its execution.

As described above, contexts are scoped. The data contained in a context is accessible by different sets of objects based on this scoping. Table Two contains examples of scoping. For example, application context objects are accessible by objects that are involved in any transactions of the application's session(s). Session context objects are accessible by any objects involved in any transactions of the current session. The scoping examples in Table Two and/or other scope designations can be used to specify the accessibility of context information.

The current transaction's application-level context is taken from the context maintained by the application. The transaction's session-level context is retrieved from the session object (e.g., the session identified in the request's session ID property). The transaction-level context is retrieved from the previous transaction's page-level context. Therefore, objects involved in the current transaction have access to the data from the previous transaction's context. The session manages the previous transaction's page context. The current transaction retrieves the previous transaction's page-level context from the session using the previous transaction ID specified in the request information. A context is associated with the transaction.

Referring to FIG. 5C, the application determines a page for the request at step 538. The application uses the path information contained in the request. If path information is not specified by the request, the application can use a default specification. The application instantiates a request object and a request page object at step 540. The page object is, for example, an instance of the scriptedControl object class. Alternatively, a different object can be instantiated as the page object. For example, an object class can be associated with a given path. An instance of that object class is then instantiated based on the path information. The instantiated object should have the ability to respond to methods that are normally sent to a page object.

At step 542, the application sends a "handleRequest" message to the page object. The message preferably includes a pointer to (or identification of) the request object. The page object responds to the "handleRequest" message. The page object extracts the information that it needs from the "handleRequest" message, for example. This information is contained in the request's form data or sender ID that are stored in the request object. The page object can use this information to determine what action needs to be taken in response to the client's request, for example. The page object can inform the transaction of what action is needed.

The page object forwards the "handleRequest" message to its children (e.g., subcontrols 918 928 of of the page scriptedControl object 916 in FIG. 9A) along with the request object. A subcontroller that receives the message examines the request object to determine whether it should be activated. If the subcontroller determines that it should be activated, it performs its operation(s) and can update the information contained in the request object.

Once all of the controllers have received the "handleRequest" message, the application looks at the request object to determine whether a controller has set an invocation. At step 546, the application queries the request object to determine what action is needed. If an action is not needed, the page solicited by the request is used to generate the client request. Processing therefore continues at step 552. If a controller has set an invocation, the application retrieves and activates the invocation at step 548. The action returns a page to be used to generate the response to the client, for example.

At step 550, the application creates a response page object. At step 552, the page creates a root object for the tree or graph of objects. The objects contained in the graph are used to generate a Web page definition (e.g., a series of HTML statements). The application sends a "prepareResponse" message to the page object along with the response object at step 554. Any method of passing information can be used with the present invention. The page object manages the generation of the object graph in response to the "prepareResponse" message. By sending this message, the application asks the page object to generate the object tree or graph of objects that contains HTML objects that can represent themselves in HTML.

The page object is, for example, a scriptedController. It determines whether it has any children that need to receive the "prepareResponse" message. If there are, it activates its children (e.g., subcontrols 918 928 of of the page scriptedControl object 916 in FIG. 9A). The page object sends the "prepareResponse" message, the response object, and the group associated with its child. A similar messaging scheme is used by the subcontrols to activate their subcontrols. The result of this process is an object tree that can be used to generate an HTTP description (e.g., HTML definition of a Web page containing JAVA and VRML components).

At step 556, the application sends a "generateDescription" message to the page object to generate the HTTP description for the client. The page object responds to the "generateDescription" message. The page object sends the message to the next level (its children) in the object tree.

The message is filtered down each level of the object tree in a similar manner (i.e., the parent level forwarding the message to the child level). An object in the object tree generates a portion of the Web page (e.g., HTML statements) in response to the "generateDescription" message. When the message is received and responded to by the leaf objects (i.e., lowest level) of the object tree, the Web page's definition is complete. The application returns the response (e.g., a Web page definition) to the server for transmittal to the client in response to the client's request. The application's processing of the client request ends at step 560.

Page Generation

When the object tree is completed, it contains the objects that are used to generate the ordered list in the HTML document. The HTML document is generated by sending a "create" message to the objects in the object tree. Referring to FIG. 7C, a "create" message is sent to the page object 702. The page object transmits a "create" message to the "SELECT_FORM" object 706. The "create" message is sent to the children, grandchildren, etc. until it reaches the "WEBPEOPLE" object 716. Because the "WEBPEOPLE" object 716 is a group object, it does not generate any HTML element statements. It passes the "create" message to its children (i.e., "FN" object 720. "LN" object 722, "FN" object 728, and "LN" object 730). The children objects send the "create" message to their children. Their children are input objects 724, 726, 732, and 734. Each of the input objects generates an INPUT HTML element statement using their property values (e.g., "type", and "value").

The response form can be generated, or rendered, at runtime using a previously-defined template, data stored in the context, and the form's objects. The response form can also be dynamically generated with or without an HTML template.

Figure 8:
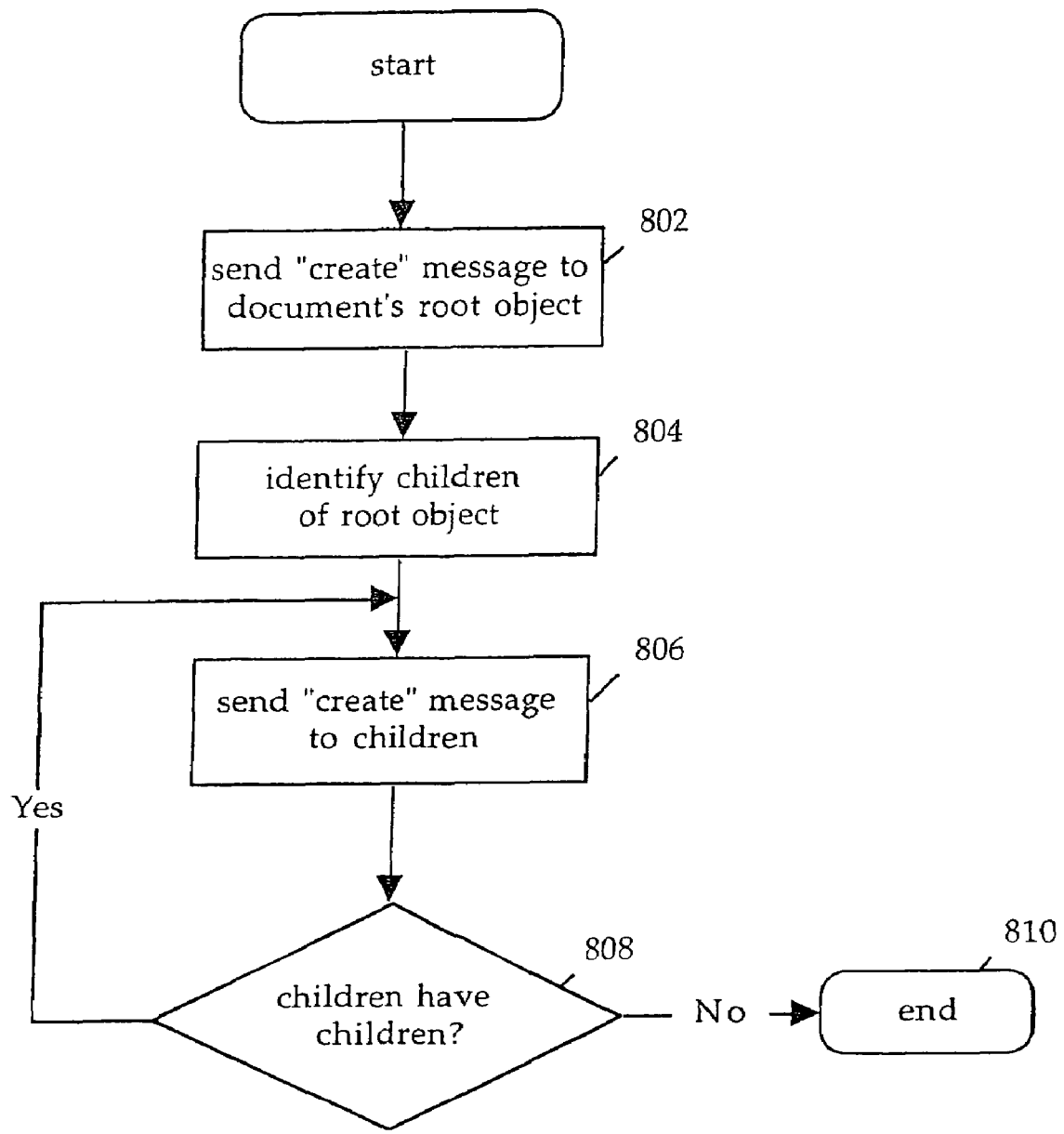
FIG. 8 illustrates a rendering process flow.

To render an HTML document, a message is sent to the page object by the application. The page object transmits a similar message to the root object. FIG. 8 provides a process flow for object-oriented HTML page rendering. At step 802, the application sends a "generateDescription" message to the root object. The root object responds to the message by rendering itself and then sending the "create" message to its children. At step 804, the root object identifies its children objects (in the object tree). At step 806, the root object sends a "generateDescription" message to its children. At step 808, a determination is made whether the children objects have children. If they do not, processing ends at step 810. If they do, the message is sent to the children at step 806. Processing continues until all levels of the object tree have received the "generateDescription" message.

Thus, the object-oriented approach used by the present invention provides the ability to dynamically generate Web page description. Some or all of a Web page description can be generated based on input received in a receive form, generated at runtime, or retrieved from an external data source (e.g., database or electronic mail system). A Web page description can be generated using resources such as template(s) declaration file(s), and custom logic. Alternatively, a Web page description can be generated from scratch without the aid of some or all of the resources.

Thus, a method and apparatus for developing and managing Internet transactions has been provided.

The invention claimed is:

1. A method for handling a web page, comprising:
 receiving from a client a returned page containing a request;
 activating one or more objects associated with said returned page;
 processing said returned page using said one or more objects; and
 verifying said request and wherein verifying said request comprises:
  obtaining a first verification string associated with said request;
  retrieving a session associated with said client;
  retrieving a session key from said session;
  generating a second verification string using said session key and a subset of information contained in said request; and
  comparing said first verification string with said second verification string;
 wherein each of at least a subset of the one or more objects stores data, includes one or more methods to manipulate data, or both.

2. A method as recited in claim 1, further comprising retrieving a session identifier from information associated with said request.

3. A method as recited in claim 2, further comprising determining that said session identifier is valid.

4. A method as recited in claim 2, further comprising determining that said session identifier is not valid and raising an error.

5. A method as recited in claim 2, wherein retrieving a session comprises retrieving a session having said session identifier.

6. A method as recited in claim 1, wherein information associated with said request comprises one or more of: an application name, a page path, a session identifier, a transaction identifier, a sender identifier, a digital signature, form data, and state information.

7. A method as recited in claim 1, wherein said first verification string comprises a digital signature.

8. A method as recited in claim 7, wherein said digital signature is generated using one or more of: a page path, a session identifier, a previous transaction identifier, and a sender identifier.

9. A method as recited in claim 7, wherein said digital signature is generated using knowledge of said session key.

10. A method as recited in claim 1, wherein the second verification string is generated by encrypting values used to generate the second verification string using an encryption algorithm.

11. A method as recited in claim 1, wherein comparing said first verification string with said second verification string comprises comparing at least a portion of said second verification string with said first verification string.

12. A method as recited in claim 1, further comprising concluding that said request is valid if said first verification string and said second verification string match.

13. A method as recited in claim 1, further comprising concluding that said request is not valid if said first verification string and said second verification string do not match and raising an error.

14. A new method as recited in claim 1, wherein said request is managed by request object.

15. A method as recited in claim 1, further comprising:
 determining whether a response is needed to said returned page; and
 performing the following when a response is needed:
  identifying response page;
  activating one or more objects associated with said response page;
  generating said response page; and
  transmitting said response page to said client.

16. A method as recited in claim 15, wherein activating one or more objects associated with said response page comprises:
 activating one or more control objects for managing the generation of said response page;
 activating a response object for managing information about said response page; and
 activating one or more context objects for maintaining state information.

17. A method as recited in claim 1, further comprising:
 determining a response web page to said returned page;
 creating a page object for said response web page; and
 invoking a script associated with said response web page.

18. A system for handling a web page, comprising:
 a processor configured to:
  receive from a client a returned page containing a request;
  activate one or more object associated with said returned page;
  process said returned page using said one or more objects; and
  verify said request and wherein to verify said request comprises to:
   obtain a first verification string associated with said request;
   retrieve a session associated with said client;
   retrieve a session key from said session;
   generate a second verification string using said session key and a subset of information contained in said request; and
   compare said first verification string with said second verification string;
  wherein each of at least a subset of the one or more objects stores data, includes one or more methods to manipulate data, or both; and
 a memory coupled to the processor and configured to provide the processor with instructions.

19. A system as recited in claim 18, wherein information associated with said request comprises one or more of: an application name, a page path, a session identifier, a transaction identifier, a sender identifier, a digital signature, form data, and state information.

20. A system as recited in claim 18, wherein said first verification string comprises a digital signature.

21. A system as recited in claim 18, wherein the processor is further configured to conclude that said request is valid if said first verification string and said second verification string match.

22. A system as recited in claim 18, wherein said request is managed by a request object.

23. A system as recited in claim 18, wherein the processor is further configured to:
   determine whether a response is needed to said returned page; and
   perform the following when a response is needed:
      identify a response page;
      activate one or more objects associated with said response page;
      generate said response page; and
      transmit said response page to said client.

24. A system as recited in claim 18, wherein the processor is further configured to:
   determine a response web page to said returned page;
   create a page object for said response web page; and
   invoke a script associated with said response web page.

25. A computer program product for handling a web page, the computer program product being embodied in a computer readable storage medium and comprising computer instructions for:
   receiving from a client a returned page containing a request;
   activating one or more objects associated with said returned page;
   processing said returned page using said one or more objects; and
   verifying said request and wherein verifying said request comprises:
      obtaining a first verification string associated with said request;
      retrieving a session associated with said client;
      retrieving a session key from said session;
      generating a second verification string using said session key and a subset of information contained in said request; and
      comparing said first verification string with said second verification string;
   wherein each of at least a subset of the one or more objects stores data, includes one or more methods to manipulate data, or both.

26. A computer program product as recited in claim 25, wherein information associated with said request comprises one or more of: an application name, a page path, a session identifier, a transaction identifier, a sender identifier, a digital signature, form data, and state information.

27. A computer program product as recited in claim 25, wherein said first verification string comprises a digital signature.

28. A computer program product as recited in claim 25, wherein said request is managed by a request object.

29. A computer program product as recited in claim 25, further comprising computer instructions for:
   determining whether a response is needed to said returned page; and
   performing the following when a response is needed:
      identifying a response page;
      activating one or more objects associated with said response page;
      generating said response page; and
      transmitting said response page to said client.

30. A computer program product as recited in claim 25, further comprising computer instructions for:
   determining a response web page to said returned page;
   creating a page object for said response web page; and
   invoking a script associated with said response web page.

* * * * *

UNITED STATES PATENT AND TRADEMARK OFFICE
CERTIFICATE OF CORRECTION

| | | |
|---|---|---|
| PATENT NO. | : 7,698,286 B2 | Page 1 of 1 |
| APPLICATION NO. | : 11/647795 | |
| DATED | : April 13, 2010 | |
| INVENTOR(S) | : Nicolas Popp et al. | |

It is certified that error appears in the above-identified patent and that said Letters Patent is hereby corrected as shown below:

In column 18, line 51, delete "programatically" and insert -- programmatically --, therefor.

In column 20, line 8, delete "scriptedcontroller" and insert -- scriptedController --, therefor.

In column 27, line 58, delete "1o".

In column 29, line 41, delete "918 928 of of the page" and insert -- 918-928 of the page --, therefor.

In column 30, line 7, delete "918 928 of of the page" and insert -- 918-928 of the page --, therefor.

In column 32, line 11, in Claim 14, after "by" insert -- a --.

In column 32, line 16, in Claim 15, after "identifying" insert -- a --.

In column 32, line 40, in Claim 18, delete "object" and insert -- objects --, therefor.

Signed and Sealed this
Eighth Day of November, 2011

David J. Kappos
*Director of the United States Patent and Trademark Office*